United States Patent
Bamji et al.

(10) Patent No.: US 8,681,124 B2
(45) Date of Patent: Mar. 25, 2014

(54) METHOD AND SYSTEM FOR RECOGNITION OF USER GESTURE INTERACTION WITH PASSIVE SURFACE VIDEO DISPLAYS

(75) Inventors: Cyrus Bamji, Fremont, CA (US); Sunil Acharya, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 12/586,432

(22) Filed: Sep. 22, 2009

(65) Prior Publication Data

US 2011/0291988 A1    Dec. 1, 2011

(51) Int. Cl.
*G06F 3/042* (2006.01)

(52) U.S. Cl.
CPC .................... *G06F 3/0421* (2013.01)
USPC .......................... 345/175; 345/173

(58) Field of Classification Search
None
See application file for complete search history.

(56) References Cited

U.S. PATENT DOCUMENTS

| | | | |
|---|---|---|---|
| 5,484,966 A * | 1/1996 | Segen | 178/18.09 |
| 6,266,048 B1 | 7/2001 | Carau, Sr. | |
| 6,310,615 B1 * | 10/2001 | Davis et al. | 345/173 |
| 6,323,942 B1 | 11/2001 | Bamji | |
| 6,515,740 B2 | 2/2003 | Bamji | |
| 6,580,496 B2 | 6/2003 | Bamji et al. | |
| 6,587,186 B2 | 7/2003 | Bamji et al. | |
| 6,678,039 B2 | 1/2004 | Charbon | |
| 6,710,770 B2 | 3/2004 | Tomasi et al. | |
| 6,906,793 B2 * | 6/2005 | Bamji et al. | 356/141.1 |
| 7,519,223 B2 * | 4/2009 | Dehlin et al. | 382/203 |
| 2008/0259053 A1 | 10/2008 | Newton | |

* cited by examiner

*Primary Examiner* — Joseph Haley
(74) *Attorney, Agent, or Firm* — Judy Yee; Leonard Smith; Micky Minhas

(57) ABSTRACT

A system recognizes user-object gesture interactions with the surface of a monitor display, with hover space defined spaced-apart from the display surface, or in virtual scroll regions defined on the periphery of the monitor display. The system recognizes user-object interactions, e.g., gestures, and can affect what is displayed commensurately. The system includes at least a first time-of-flight (TOF) system and at least one of a second TOF, a two-dimensional camera, and a mirror, each TOF system processing at least one of z-depth data and A-brightness data. User-object interactions, e.g., touching(s) of the display surface, location(s) in a hover region, or location(s) in a virtual scroll region, are recognized passively in that the user-object need not have capacitance, resistance, exert force, or deform during gesture interaction. The system may be attached retroactively to the monitor, which may be a large (>22 cm) monitor, or a small cell phone sized monitor.

20 Claims, 13 Drawing Sheets

METHOD AND SYSTEM FOR RECOGNITION OF USER GESTURE INTERACTION WITH PASSIVE SURFACE VIDEO DISPLAYS

FIELD OF THE INVENTION

The invention relates generally to user interaction with video displays, large and small, including displays having a diagonal greater than about 22 cm, and preferably greater than about 40 cm, including recognition of passive user gestures created with two or more fingers (or other user-objects) simultaneously. Gesture recognition preferably is passive in that the display surface does not use or rely upon active sense lines, or rely upon capacitance, or resistance, or exerted force or pressure by the user manipulated object(s) with which user gestures are created. Preferably the system is retrofittable to an existing large screen display and employs time-of-flight (TOF) sensing of the user manipulated object(s). Recognizable gestures include hovering gestures made near but without contacting the surface of the large screen video display, and can include user-interaction with virtual scroll regions defined in space adjacent peripheral regions of the display. Although most of the described embodiments are well suited for large screen displays, embodiments of the present invention could be scaled down to for use in small displays such as are found on handheld devices including cell phones, and could enable gesture and hover recognition in cell phones and the like.

BACKGROUND OF THE INVENTION

Direct user interaction with video displays has become relatively common in recent years. A decade ago it was common for users to interact with information shown on a computer video display by manipulating a mouse, perhaps to select an option from a displayed menu, and/or perhaps to drag a user-selected object or object region from position to position on the video display. But such interaction was not necessarily intuitive in that a user new to computers would not necessarily know what to do without some instruction. Further, although such prior art user interaction techniques could often detect and distinguish between a user selection manipulation and a user object drag manipulation, such techniques could not readily detect when the user or user-controlled stylus hovered near but not yet contacting the video display screen.

More recently, a class of small sized computing type devices has gained favor in which a user can directly touch a display to manipulate information being displayed, e.g., to select, to drag, but not to detect when the user or user-controlled stylus merely hovers near the display surface without touching the surface. One very popular such device is the handheld iPodTouch® unit, produced by Apple Corp®. This device has a small, approximately 8 cm diagonal, active screen whose display responds to gestures made by a user's fingers. It is believed that this screen contains an X-Y grid of capacitive sensing lines that are not visible to the user. FIG. 1 depicts an exemplary such device 10 and active screen 12, within which an X-Y grid of capacity sensing lines 14 are formed at time of manufacture. Electronics within device 10 can cause images such as virtual menu buttons 16 to be displayed dynamically on the screen. As the user-object, here finger(s) 18 touch the surface of display 12, finger capacity is sensed by the grid lines 14, and the appropriate quantized region(s) of interaction, such as regions 20A, 20B, 20C, 20D can be detected by electronics 22 within the device. Understandably as pitch or density of the grid lines increases, a smaller region, e.g., rectangles bounded by grid lines, of user-interaction can be defined and sensed.

Execution of software associated with electronics 22 enables device 10 to recognize and respond to gestures made by user fingers interacting with the surface of the screen. For example, two fingers 18 moving up or down can scroll the screen image up or down, e.g., to display additional menu buttons 16 in FIG. 1. Two fingers moving toward each other can shrink the size of an image displayed on the screen; if the two fingers are moved away from each other the image size expands, in zoom fashion. If the two fingers are rotated, the displayed image will rotate in the same direction. Such user interaction and the associated gesture recognition are extremely intuitive in that little or no instruction is required to master use of the device. In other applications, gestures using more than two fingers may be recognized. Such active gesture recognition has the advantage of not relying upon a light source for detection; the capacitive interaction could be detected in a dark room, although to be useful, the display itself will be illuminated.

Although the above-described gesture recognition technology seems to work quite well, production economics dictate that the size of screen 12 be relatively small, e.g., about 3.5" (9 cm) diagonally. Further, the user-object that interacts with the specialized screen must actually touch the display surface to be detected, and cannot merely hover near the display surface. Finally, the user-object must exhibit capacitance to be detected as it interacts with the screen surface. Thus while a user's fingers touching the screen are recognized by the device, if the user wore gloves, perhaps in cold weather, no capacitance would be sensed through the gloves, and no user gesture would be recognized. A similar result occurs if the user-object were a passive wooden or plastic stylus held by the user. Thus, sensing here requires active, not passive, interacting contact with the screen by a user-object, e.g., an object that possesses meaningful magnitude of capacitance. Note too that the screen itself must be dedicated to the type of gesture sensing, e.g., there must be a grid of capacitive (or other) sense lines provided when the display screen is manufactured. As such, it is hard to apply this technology retroactively to an existing off-the-shelf type display.

Another approach to recognizing user gestures made with at least two user objects (e.g., fingers, styli) with respect to an image on a video display involves use of stereographic cameras and triangulation. U.S. Pat. No. 6,266,048 (2001) to Carau entitled "Method and Apparatus for a Virtual Display Keyboard for a PDA" describes a stereographic method by which user interaction with a virtual keyboard is said to be feasible. However as will be described with respect to exemplary FIG. 2A, stereographic acquisition of image data can result in acquisition of fictitious and ambiguous data, which can render the stereographic approach less than ideal. FIG. 2A depicts a display screen 32 to which are attached two spaced-apart cameras 34A, 34B, whose two fields of view (FOV-A, FOV-B) attempt to encompass the working surface of the display screen. Corner-mounting of the cameras advantageously requires the smallest possible usable FOV, namely 90°. Wherever they are mounted, the two cameras should not have their optical axes in coaxial juxtaposition, otherwise blocking interference will result. In FIG. 2A, cameras 34A and 34B try to simultaneously capture images of the user objects, e.g., fingers 18-1, 18-2, and the display, including images presented on the display such as virtual menu buttons 36. The display screen surface and user-object interaction may be passive in that there is no requirement for embedded sense lines, or other detectors of user-object physical properties such as resistance, force, or the like. Of course there must be sufficient light for the cameras to capture images of user objects and the display screen. The video images captured by the two cameras are processed and triangulation used to try to determine where each user object contacted the display. This approach can avoid requiring a dedicated display, e.g., the display need not be manufactured with any mechanism (grid lines, resistive lines, force or pressure sensors) but other limitations are present. For example, the cameras cannot reliably see and thus distinguish between actual user-object contact with the surface display as opposed to the user-object merely hovering or grazing close to the surface of the display.

A more severe problem with stereographic cameras is that when two user-objects, e.g., fingers 18-1, 18-2 in FIG. 2A touch or otherwise interact with the display, ambiguities can exist as to where on the display the interaction occurred. In stereographic acquisition, every location on the acquired image is the logical "AND" of the imagery acquired from both cameras. Understandably, then, problems arise when the first user-object blocks or occludes view of the second user-object for one of the cameras. In this example, one stereo camera will image the object closer to that camera, but cannot image the other object, whose view if blocked by the first object. In this example, the second camera can see both objects, but the data from which position of the two objects relative to the display is ambiguous, and the point(s) of interaction with the display cannot be correctly determined using triangulation. FIG. 2B depicts ambiguous data, shown as falsely sensed positions (drawn in phantom) for two real user objects 18-1, 18-2. Thus, the two-finger gesture made in FIG. 2B may be misinterpreted by cameras 34A, 34B due to false reporting of the ambiguous image locations. Obviously gestures made with three fingers (or user objects) would further increase the likelihood of occlusion and resultant ambiguity. Thus, three-finger gestures are even more likely to be erroneously determined as to where on the display fingers or other user objects interacted. As a result, a gesture commanding rotation of a displayed image might be wrongly interpreted by the stereographic cameras as a gesture to resize the image. Another problem associated with data acquired from spaced-apart stereographic two-dimensional cameras is that if the system is jarred or bumped, mechanical misalignment can readily result, in which case substantial errors can occur in the acquired data, above and beyond ambiguity-type errors.

A structured light approach to discerning user interaction with a virtual keyboard was described by Tomasi in U.S. Pat. No. 6,710,770 (2004) Quasi-Three-Dimensional Method and Apparatus to Detect and Localize Interaction of User-Object and Virtual Transfer Device, assigned to assignee herein. The '770 patent described a standalone device that projected an image of a keyboard, and detected user interaction with virtual keys on that keyboard using structured light. A thin fan beam of light, perhaps infrared light, was projected parallel to and spaced perhaps 1 mm above the projected image of the virtual keyboard (and virtual keys). A sensor array disposed near the top of the device looked down upon the projected fan beam. The array only sensed light when a user object penetrated the fan beam, and thus reflected energy towards the sensor array. The geometry between the sensor array, the fan beam, and the virtual keyboard was known a priori, and triangulation enabled reliable identification as to which virtual keys were contacted by the user objects, e.g., fingers, and in what temporal order. Advantageously, this device did not rely upon ambient light to function, and would work with passive user-controlled objects, e.g., styli.

FIG. 3 depicts how a Tomasi type system 40 might be used to discern interaction between displayed objects, e.g., menu keys 36, an image 38, etc. on a display screen 32 and a single user object, e.g., a finger 18-1. Within system 40, a laser or LED device 42 emits a very thin fan beam 44 of optical energy in a plane parallel to the flat surface of display screen 32, and spaced-apart from that surface a mm or so, as to barely graze the airspace above the display screen. The emitter laser or LED optical energy need not be visible to the human user. System 40 further includes a single sensor array 46 that looks toward the display screen. Sensor array 46 detects optical energy of the emitted wavelength that is reflected back by anything protruding through the thickness of the fan beam, e.g., reflected optical energy 48. If nothing penetrates the fan beam, then no optical energy is reflected back to be sensed by system 40. But if an object, here user finger 18-1 touches something on the display screen, at least a tip portion of the finger will have penetrated the thickness of the fan beam, and will reflect back some of the emitted laser or LED optical energy. As soon as sensor array 46 within system 40 detects reflected-back optical energy of the appropriate wavelength, it is known that a user object has touched some region of the display screen. The geometry and relationship of emitter 42, fan beam 44, and sensor array 46 vis-à-vis objects, e.g., 36, 38, appearing on display 32 is known a priori.

A Tomasi system 40 as shown in FIG. 3 uses triangulation to determine the (x,z) coordinates of the touched area. A processor within system 40 knows what objects appear at what (x,z) coordinates on display surface 32 and can determine the appropriate response to make to the user interaction with that object. However it will be appreciated that user-object obstruction can occur if for example one finger blocks the view of system 40 of a second finger. Thus, a two-finger gesture might be misinterpreted by system 40. One might dispose a second system 40' at another corner of the display screen, which system emits a second fan beam 42', spaced apart vertically from the first fan beam. Preferably different wavelengths would be used to generate fan beams 42, 42' such that sensors within respective system 40, 40' would respond to the appropriate reflections. Further details as to design considerations associated with a Tomasi type system may be found in the referenced '770 patent, and will not be repeated here.

Such a dual system might work in theory but problems exist. The geometry of the Tomasi systems does not lend itself well to detecting user interactions with a large video display. In virtual keyboard applications described in the '770 patent, the spaced-apart distance Y between fan beam emitter and sensor array was perhaps 3 cm. But to achieve reasonably accurate triangulation with a truly large display screen, say 36" or 92 cm diagonally, the distance Y between fan beam emitter and sensor array would be about 15 cm. Such implementation would not be very robust in that system(s) 40, 40' would project outwardly from the display and be vulnerable to damage from being bumped or vibrated. Further, the a priori geometry needed for successful triangulation would be altered each time outwardly projecting system(s) 40, 40' were bumped or vibrated. Thus, on one hand, use of a fan beam to detect occasion of user interaction with an object displayed on the screen is feasible. But on the other hand, using a large diagonal screen renders accurate triangulation difficult unless there is a relatively large spaced-apart distance Y between fan beam emitter and sensor array, e.g., perhaps 20%-25% of the display screen diagonal dimension. Further, mechanical vibration or bumping of the large screen display would result in undesired mechanical movement of the sensor array, with resultant errors in performance due to resultant loss of good calibration.

One attempt to implement a touch screen that includes hover detection is described in published U.S. patent application Ser. No. 12/101,527, publication no. 2008/0259053 to Newton, entitled "Touch Screen System With Hover and Click Input Methods". This method appears to require that the user's finger or stylus "flatten-out" as it contacts the touch screen surface such that the finger or stylus area of contact becomes larger when contact is made than before contact is made. Newton's method uses first and second detectors in proximity to the touch screen that generate images of the user's finger or stylus interacting with the touch screen. The outer edges of the imaged finger or stylus are determined as is the estimated cross-sectional area of the finger or stylus. This area will be smaller before contact with the screen is made, because contact tends to increase the area. FIGS. 3B and 4B depict this increase in area at time of contact for a user's finger, while FIGS. 6A and 6B depict an area increase when using a spring-loaded stylus. If the estimated area does not exceed a threshold area, then it is assumed the object interaction denotes a tracking state, and if the estimated area exceeds a threshold area, then it is assumed a selection state is occurring. How well this method functions is unknown to applicants herein, but absent a physical change in estimated cross-sectional area at time of actual contact, the method will not function. Thus if a user manipulated an ordinary, e.g., rigid, stylus whose contact area could not increase upon contact with the display surface, the described method would appear not to discern between a tracking state and a selection state.

Consider now other approaches to ascertaining distance to an object. It is known in the art to use so-called time-of-flight (TOF) technology to ascertain distance to an object. FIG. 4 shows a TOF system as described in U.S. Pat. No. 6,323,942 to Bamji, et al., entitled "CMOS-Compatible Three-Dimensional Image Sensor IC", and assigned to assignee herein. In FIG. 4, TOF system 50 emits optical radiation 51 toward a target object 52 and counts the roundtrip time it takes from at least some of the emitted radiation to reflect off the target object as reflected radiation S2 and be detected by the system. The distance Z between system 50 and the target object is given by equation (1) as:

$$Z = C/(2 \cdot f) \quad (1)$$

where C is speed of light, 300,000 Km/sec, and f is frequency of the emitted (and detected) optical energy. In practice, distance Z is known modulo $2 \cdot \pi \cdot C/(2 \cdot \omega) = C/2 \cdot f$, where f is the modulation frequency. Thus there can be inherent ambiguity between detected values of phase shift θ and distance Z, and methods including use of multi-frequencies can be employed to disambiguate or dealias the data.

As described in the '942 patent, much if not all of system 50 may advantageously be fabricated on a single IC 54 without need for any moving parts. System 50 includes an array 56 of pixel detectors 58, each of which has dedicated circuitry 60 for processing detection charge output by the associated detector. In a typical application, array 56 might include 100×100 pixels 58, and thus include 100×100 processing circuits 60. Preferably IC 54 also includes a microprocessor or microcontroller unit 62, memory 270 (which preferably includes random access memory or RAM and read-only memory or ROM), a high speed distributable clock 66, and various computing and input/output (I/O) circuitry 68. Among other functions, controller unit 62 may perform distance to object and object velocity calculations. Preferably the two-dimensional array 56 of pixel sensing detectors is fabricated using standard commercial silicon technology, which advantageously permits fabricating circuits 62, 64, 66, 68 on the same IC 54. Understandably, the ability to fabricate such circuits on the same IC with the array of pixel detectors can shorten processing and delay times, due to shorter signal paths.

In overview, system 50 operates as follows. At time t0, microprocessor 62 commands light source 70 to emit a pulse of light of known wavelength (λ) that passes through focus lens 72' and travels to object 52 at the speed of light (C). At the surface of the object being imaged at least some of the light may be reflected back toward system 50 to be sensed by detector array 56. In one embodiment, counters within system 50 can commence counting when the first light pulse emission S1 is generated, and can halt counting when the first reflected light pulse emission S2 is detected. The '942 patent describes various techniques for such counting, but the further away object 52 is from system 50, the greater will be the count number representing the round-trip time interval. The fundamental nature of system 50 is such that reflected light S2 from a point on the surface of imaged object 52 will only fall upon the pixel (58-x) in array 56 that is focused upon such point.

Light source 70 is preferably an LED or a laser that emits energy with a wavelength of perhaps 800 nm, although other wavelengths could instead be used. Use of emitted light pulses having a specific wavelength, and use of optional lens-filters 74 enables TOF system 50 to operate with or without ambient light, including operating in total darkness.

Within array 56, each pixel detector will have unique (x,y) axis locations on the detection array, and the count output from the high speed counter associated with each pixel detector can be uniquely identified. Thus, TOF data gathered by two-dimensional detection array 230 may be signal processed to provide distances to a three-dimensional object surface. It will be appreciated that output from CMOS-compatible detectors 240 may be accessed in a random manner if desired, which permits outputting TOF DATA in any order.

FIGS. 5A-5C depict a so-called phase shift type TOF system 50'. In such system, distances Z to a target object are detected by emitting modulated optical energy Sout of a known phase, and examining phase-shift in the reflected optical signal Sin from the target object 52. Exemplary such phase-type TOF systems are described in several U.S. patents assigned to Canesta, Inc., assignee herein, including U.S. Pat. Nos. 6,515,740 "Methods for CMOS-Compatible Three-Dimensional Imaging Sensing Using Quantum Efficiency Modulation", 6,906,793 entitled Methods and Devices for Charge Management for Three Dimensional Sensing, 6,678,039 "Method and System to Enhance Dynamic Range Conversion Useable With CMOS Three-Dimensional Imaging", 6,587,186 "CMOS-Compatible Three-Dimensional Image Sensing Using Reduced Peak Energy", 6,580,496 "Systems for CMOS-Compatible Three-Dimensional Image Sensing Using Quantum Efficiency Modulation". FIG. 5A is based upon the above-referenced patents, e.g. the '186 patent.

In FIG. 5A, exemplary phase-shift TOF depth imaging system 50' may be fabricated on an IC 54 that includes a two-dimensional array 56 of single-ended or differential pixel detectors 58, and associated dedicated circuitry 60 for processing detection charge output by the associated detector. Similar to the system of FIG. 3, IC 56 preferably also includes a microprocessor or microcontroller unit 62, memory 64 (which preferably includes random access memory or RAM and read-only memory or ROM), a high speed distributable clock 66, and various computing and input/output (I/O) circuitry 68. Among other functions, controller unit 62 may perform distance to object and object velocity calculations.

In system 50', under control of microprocessor 62, optical energy source 70 is periodically energized by an exciter 76, and emits modulated optical energy toward an object target 52. Emitter 70 preferably is at least one LED or laser diode(s) emitting low power (e.g., perhaps 1 W) periodic waveform, producing optical energy emissions of known frequency (perhaps a few dozen MHz) for a time period known as the shutter time (perhaps 10 ms). Similar to what was described with respect to FIG. 4, emitter 70 typically operates in the near IR range, with a wavelength of perhaps 800 nm. A lens 72 may be used to focus the emitted optical energy.

Some of the emitted optical energy (denoted $S_{out}$) will be reflected (denoted $S_{in}$) off the surface of target object 20. This reflected optical energy $S_{in}$ will pass through an aperture field stop and lens, collectively 74, and will fall upon two-dimensional array 56 of pixel or photodetectors 58. When reflected optical energy $S_{in}$ impinges upon the photodetectors, photons within the photodetectors are released, and converted into tiny amounts of detection current. For ease of explanation, incoming optical energy may be modeled as $S_{in}=A\cdot\cos(\omega\cdot t+\theta)$, where A is a brightness or intensity coefficient, $\omega\cdot t$ represents the periodic modulation frequency, and $\theta$ is phase shift. As distance Z changes, phase shift $\theta$ changes, and FIGS. 5B and 5C depict a phase shift $\theta$ between emitted and detected signals. The phase shift $\theta$ data can be processed to yield desired Z depth information. Within array 156, pixel detection current can be integrated to accumulate a meaningful detection signal, used to form a depth image. In this fashion, TOF system 40' can capture and provide Z depth information at each pixel detector 158 in sensor array 56 for each frame of acquired data.

As described in the above-cited phase-shift type TOF system patents, pixel detection information is captured at least two discrete phases, preferably 0° and 90°, and is processed to yield Z data.

System 50' yields a phase shift $\theta$ at distance Z due to time-of-flight given by:

$$\theta = 2\cdot\omega\cdot Z/C = 2\cdot(2\cdot\pi\cdot f)\cdot Z/C \quad (2)$$

where C is the speed of light, 300,000 Km/sec. From equation (2) above it follows that distance Z is given by:

$$Z = \theta\cdot C/2\cdot\omega = \theta\cdot C/(2\cdot 2\cdot f\cdot\pi) \quad (3)$$

And when $\theta = 2\cdot\pi$, the aliasing interval range associated with modulation frequency f is given as:

$$Z_{AIR} = C/(2\cdot f) \quad (4)$$

In practice, changes in Z produce change in phase shift $\theta$ but eventually the phase shift begins to repeat, e.g., $\theta = \theta + 2\cdot\pi$, etc. Thus, distance Z is known modulo $2\cdot\pi\cdot C/2\cdot\omega) = C/2\cdot f$, where f is the modulation frequency. Thus there can be inherent ambiguity between detected values of phase shift $\theta$ and distance Z. In practice, multi-frequency methods are used to disambiguate or dealias the phase shift data.

FIG. 6 depicts what is purported to be a TOF method of implementing a large scale virtual interactive screen, as noted in a publication entitled "SwissRanger SR3000 and First Experiences Based on Miniaturized 3D-TOF Cameras", by Thierry Oggier, et al., Swiss Center for Electronics and Microtechnology (CSEM), Zurich, Switzerland. (Applicants do not know the date of publication other than the date is 2005 or later. Unfortunately the publication does not provide any sort of disclosure other than the system, shown as 50, includes a projector 52 that projects a large 1 m×1.5 m display 54 that presents user-interactable objects that apparently can include display objects, menu keys, etc. At the upper left of the display screen is mounted a TOF camera 56 that is said to capture the scene in front of the displayed screen. The publication says that the task of the TOF camera is to detect and locate movements of the user's hand touching the screen, and that based on the movements, control sequences are sent to a computer. Other than professing to use TOF technology and a single TOF camera, nothing else is known about this CSEM approach. Whether this CSEM system can recognize multi-finger gestures is not stated in the publication.

What is needed is a preferably retrofittable system and method of implementation by which a user can passively interact with large screen video display, and can manipulate objects presented on the display using gestures comprising one, two, or more fingers (or other user-controlled objects). Preferably such system should also detect hovering-type user interactions with the large screen video display, i.e., interactions in which the user manipulated object(s) is in close proximity to the surface of the video display, without being sufficiently close to actually contact the surface, including user-object interaction with virtual scroll regions defined adjacent the video display.

The present invention provides such a system and method.

SUMMARY OF THE PRESENT INVENTION

In one embodiment, user interaction with objects presented on a screen display whose surface may be passive is sensed with at least two TOF systems, augmented by triangulation (e.g., spaced-apart stereographic cameras or structured light). The user's hand or stylus or wand or other user-object with which interaction may be made can be passive in the sense that it need not manifest electrical capacitance, or resistance, or physical force, or deformation during interaction. Further the size of the display screen may be small, perhaps a few cm in transverse dimension as found on a handheld cell phone, PDA, or the like, or may be rather large, e.g., screen diagonal about 22 cm, or perhaps 40 cm or more. Cell phones and the like so enabled could recognize user-object interactions including gestures, as could computer systems having a larger monitor display with which the user can interact. The TOF systems are disposed at regions of the display periphery so as to view user-objects, e.g., user finger(s), in proximity to the display surface. The TOF systems may operate similarly to what is shown in FIG. 4, e.g., not phase-based, or phase-based, similar to what is shown in FIG. 5A. If desired, one TOF system could be phased-based and the other TOF system not phase based. Using at least two TOF systems minimizes the likelihood of a user gesture comprising two or more fingers being improperly detected due to occlusion of one finger by another finger. Each TOF system includes an emitter of optical energy and a sensor array that detects a fraction of the emitted optical energy that is reflected-back by an object in close proximity to or touching the surface of the display screen. A processor associated with each TOF system knows dynamically what objects are displayed on what portions of the display screen at any time. The processor receives the detected TOF data and discerns therefrom the (z,x) coordinate of each touching of the surface of the display screen, and generates the appropriate command(s) in response to the perceived user gesture(s).

The TOF system advantageously preferably can detect a user-object hovering near the surface of the display screen without requiring user-object contact with the display screen surface. Thus user-object interaction can be detected in a hover region spaced-apart from the display screen surface in the y-direction, as well as be detected when there is actual user object touching of the display screen. Preferably less optical energy is emitted into the hover-detection region than is emitted closer to the display screen surface and used to detect user-object contact with the display screen surface.

This shaping of intensity of TOF system emitted optical energy with greater density closer to the display screen surface enhances the operating efficiency of the TOF system, while implementing detection of user interaction that may include "hovering" gestures, in addition to the usual select, drag, expand, rotate, etc. type gestures. The TOF system(s) may be retrofitted to an existing large screen display, and can sense passive user interactions, e.g., interactions with or in close proximity to the display surface made by a user's gloved-hand, made by a plastic or wooden stylus or styli held by a user, etc. The stylus may of course be rigid, and is not required to alter its cross-sectional area at point of contact with the display screen surface In another embodiment, user interaction with objects presented on a large screen display is sensed with at least one TOF system and another system that includes at least one mirror, the TOF system(s) and mirror(s) disposed at regions of the display periphery so as to view objects, e.g., user finger(s), in proximity to the display surface. The TOF system (s) may be as described above for the first embodiment, and may be phase-based or otherwise. The mirror(s) encompasses portions of the display screen and user interaction therewith that may be obscured by user fingers if only one TOF system were employed. Understandably an advantage of using a mirror to replace a TOF system is a substantial savings in cost. The TOF system(s) and mirror(s) may be retrofitted to an existing large screen display, and can sense passive user interactions, e.g., interactions with or in close proximity to the display surface made by a user's gloved-hand, made by a plastic or wooden stylus or styli held by a user, etc.

In another embodiment, user-object interaction with objects presented on a large screen display, or with three-dimensional hover space defined adjacent the display, or with virtual scroll regions defined adjacent the display periphery is sensed using at least first and second TOF systems. The TOF systems have fields of view encompassing the regions of potential interest, and each TOF system creates or processes at least one type of TOF data, e.g., z-depth data or A brightness data, e.g., brightness data from the active light source, generally excluding brightness effects of ambient light.

In another embodiment, user interaction with objects presented on a large screen display is detected using two systems comprising a pair of spaced-apart two-dimensional RGB or gray scale camera, augmented by at least one TOF system. The two cameras have FOVs that can image substantially the entire display screen and if virtual scroll or virtual slide regions are provided, such scroll regions as well. The TOF system processes at least one of z-depth data and (active light source) A brightness data to quickly resolve distance ambiguities that typically plague spaced-apart stereographic systems. This multi-modal system enables two-dimensional data from the two cameras to be disambiguated quickly using at least one type of TOF data.

In yet another embodiment, user interaction with objects presented on a large screen display is detected using a combination of structured light and triangulation with TOF sensing. At least one thin fan beam of light is disposed parallel to and spaced-apart a very small distance from the plane of the display. A sensor detects occurrence of an object penetration of the fan beam by sensing reflected-back emitted optical energy. At least one TOF system is used to determine where in the (x,z) plane penetration occurred, thereby learning what portion of what object was touched. The system then processes this information to appropriately manipulate or respond to the user's interaction with the object. Use of a second TOF system reduces likelihood of occlusion of one finger by another, as in the case of a multi-finger gesture.

These systems use TOF data rather than triangulation to locate the user-interaction. Thus, the spaced-apart distance between fan beam emitter and sensor array (used to detect reflected optical energy) can be reduced to yield a small, robust system.

In another embodiment, a single TOF system is used, and likelihood of occlusion of one finger by another is reduced by using at least one mirror to image at least a portion of the display screen. The virtual data generated by the mirror can be processed as though the data were obtained by a TOF system, a component that is more costly than a mirror.

In another embodiment, at least two TOF systems, or one TOF system and one mirror, are used to detect occurrence and location of user interaction with object(s) presented on a display screen.

In yet another embodiment, virtual scroll or virtual slide regions are defined adjacent to but external to perimeter regions of the display screen. A user can interact within these virtual regions to control or manipulate objects, and/or to control or manipulate the display screen itself.

In embodiments in which hover detection is implemented, preferably the TOF system emitted optical energy has a gradient in that more energy is directed at and very close to the surface of the display screen, with less energy being directed into the hover region that is spaced-apart from the display screen surface.

Aspects of the various embodiments may be combined with one another. For example, the virtual scroll or slide regions may be defined in conjunction with the various embodiments. In the various embodiments, hover detection, e.g., detection of the user's hand, finger(s), or user-manipulated stylus or the like in a hover region that is defined close to but not touching the surface of the display may be detected without requiring the user's hand or stylus to deform or change cross-sectional area upon contact with the display surface. Various embodiments may include TOF system emission of graded intensity optical energy.

Other features and advantages of the invention will appear from the following description in which the preferred embodiments have been set forth in detail, in conjunction with their accompanying drawings.

DETAILED DESCRIPTION OF THE PREFERRED EMBODIMENT

Figure 5A:
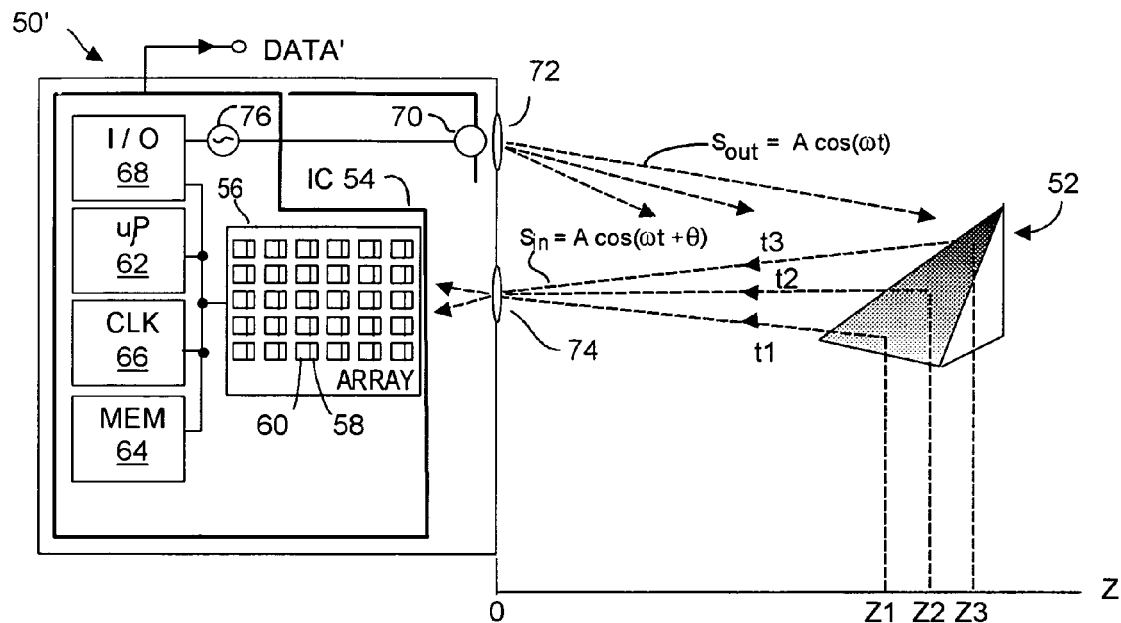
FIG. 5A is a block diagram depicting a phase-type TOF three-dimensional imaging system, according to the prior art.
Figure 5B:
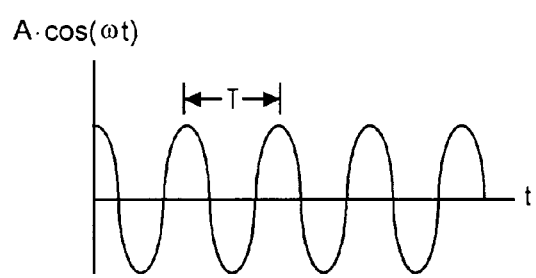
FIGS. 5B and 5C depict emitted and reflected optical energy waveforms associated with the imaging system of FIG. 5A, according to the prior art.
Figure 5C:
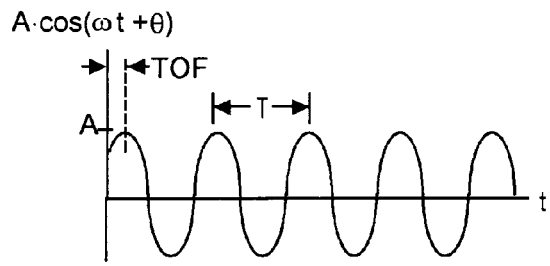
Figure 6:
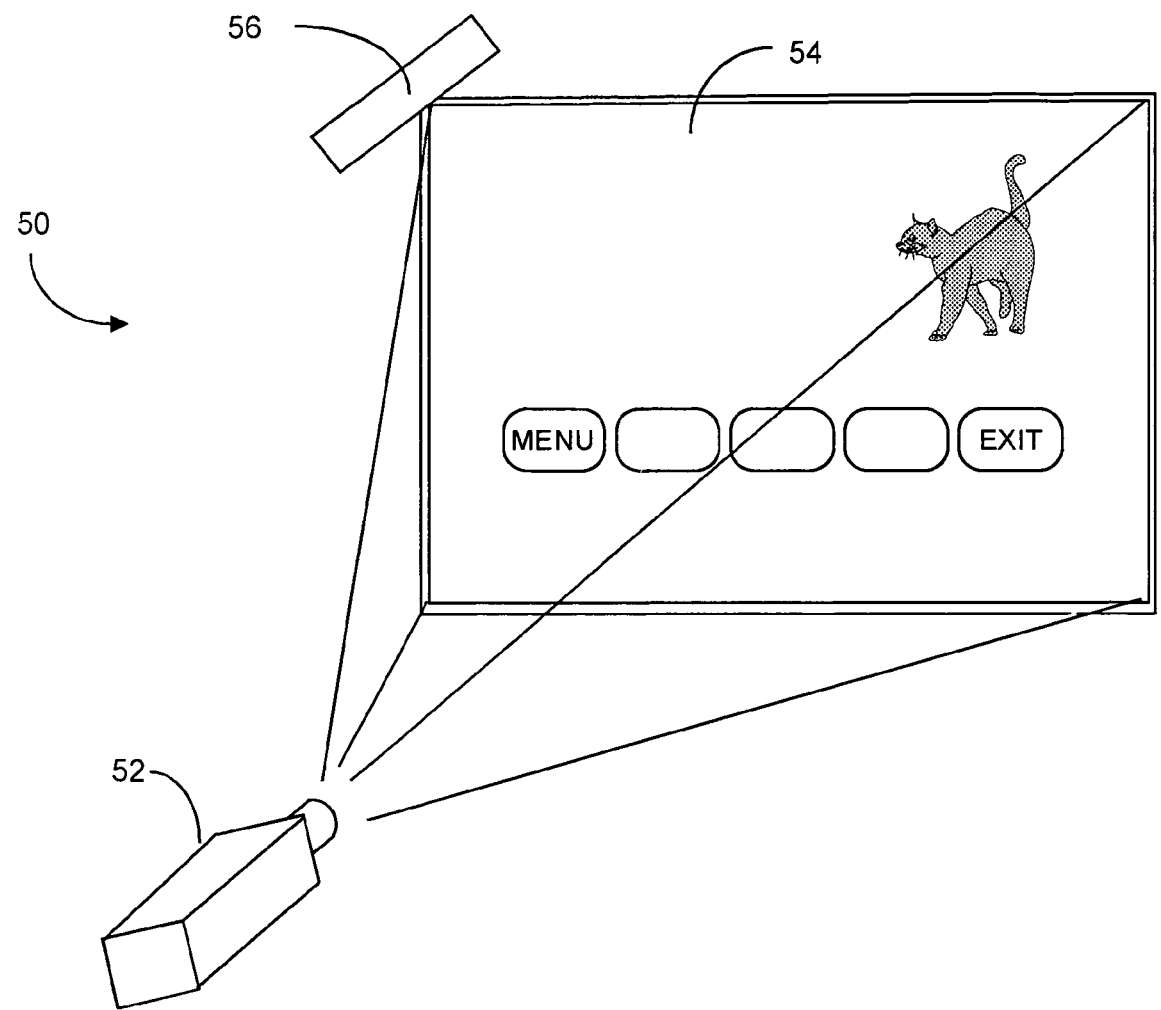
FIG. 6 depicts what is purported to be a TOF system to detect user interaction with a virtual interaction screen, according to the prior art.
Figure 7A:
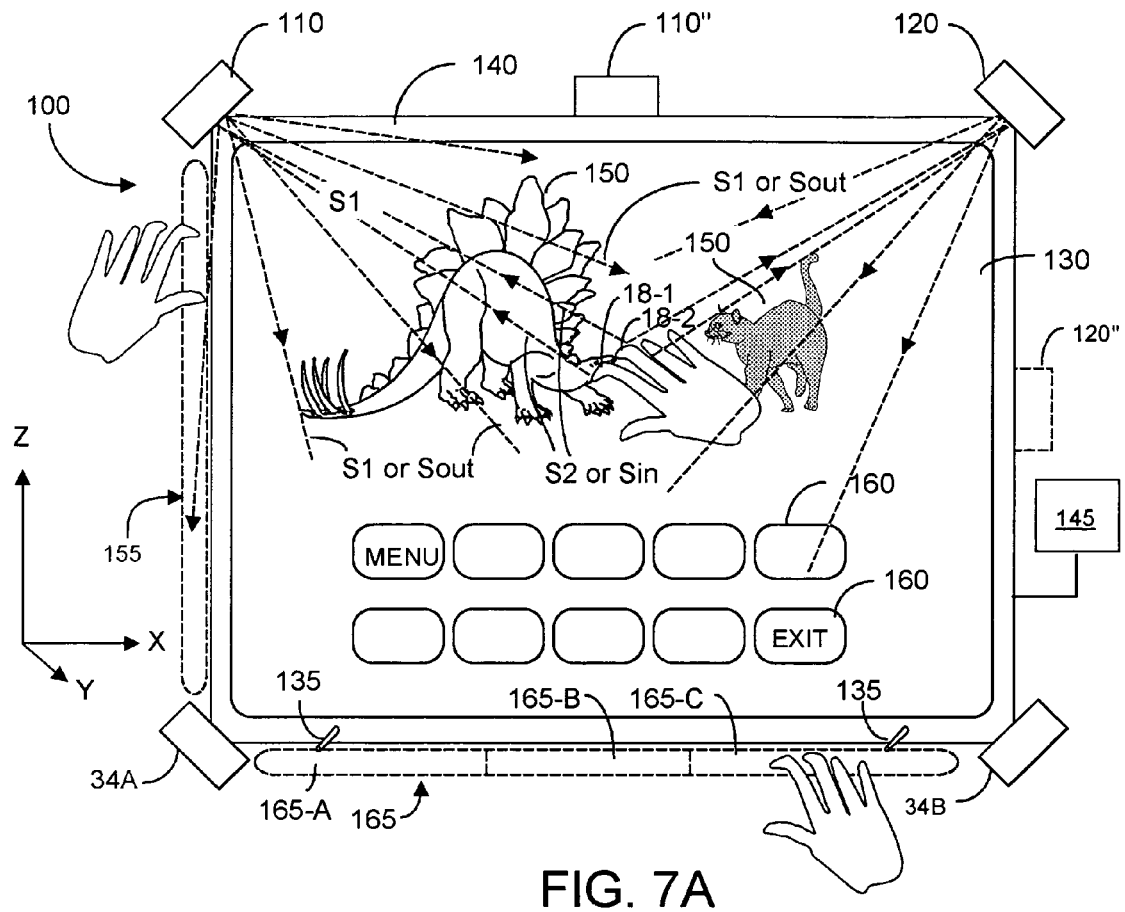
FIG. 7A depicts a TOF-based system for recognition of passive user gestures made on or adjacent a large screen video display including virtual scroll regions, according to embodiments of the present invention.

FIG. 7A depicts a system 100 comprising first and second TOF systems 110, 120 disposed so as to have fields of view that include the surface region 130 of a large video display 140. It is understood that the fields of view are sufficiently large to enable each system 110, 120, etc. to acquire three-dimensional data from substantially all of the useful portions of surface region 130 of display 140. Display 140 may have a diagonal of 40 cm or more, and may include, without limitation, a projection display, a conventional CRT display, an LCD display. Images and objects 150, 160 may be dynamically presented on display 140 for user viewing and interaction. The creation and presentation of such images and objects preferably is under control of a processor 145 coupled to display 140. In FIG. 7A as with other figures herein, for ease of illustration, signal lines between the various TOF systems, e.g., 110, 110', 110", 120, 120', 120", and processor 145 are not depicted. Processor 145 may be built into the display, or may be part of an external computer (not shown) that is coupled to the display via wires or wirelessly. A user can dynamically interact with one or more objects presented on the display, for example by hovering over or touching the object with one or more user-objects, e.g., fingers 18-1, 18-2, or perhaps styli, a wand or wands, etc. In contrast to many prior art approaches, it will be appreciated that user-objects 18-1, 18-2 may be passive, e.g., they need not emit electricity, or exhibit capacitance, or exert force or pressure on the display screen surface. As such, user-interaction with the display screen surface is referred to as passive herein. In further contrast to many of the described prior art approaches, user-objects 18-1, 18-2 may simply hover close to and over the surface of the display and/or actually touch the surface of the display. One or more TOF systems 110, 120 may be phase-type TOF such as described with respect to FIG. 5A or non-phase-based TOF, such as described with respect to FIG. 5A. (If a non-phased base system is used, element 76 may be eliminated.) System 100, as indeed are the other embodiments described herein, is retrofittable in that display 140 may be a generic, off-the-shelf unit, to which TOF systems 110, 120, etc., may later be attached to implement embodiments of the present invention. Components and sub-systems shown in FIG. 7B may be identical to what was described with respect to like-numbered components or sub-systems in FIG. 5A or FIG. 5B.

Optionally system 100 preferably includes at least one fiducial marker 135 provided on or attached to display 140 in a known (z,x) location within the relevant FOV. FIG. 7A depicts two such markers attached to a lower peripheral region of the display although of course more fiducial markers could be used. In FIG. 7A, each marker 135 is depicted as projecting outwardly (in the y-dimension) a few mm or so, from a location that is known a priori, and is readily identifiable within the relevant FOV to enable system 100 to self-calibrate. More preferably, rather than project outwardly and be difficult to manufacture and perhaps distracting to the system user, the fiducial markers may instead be imprinted within the relevant FOV on surface regions such as the screen bezel. Printing preferably is done using a bright marking paint that is visible in the IR, and thus not visible to the human user, e.g., a retro-reflective paint in the IR spectrum. Within pixel array 56 (see FIGS. 4, 5, 7A, 7B), often errors between pixels are correlated. For example, drifts in radial distance induced by temperature, jitter due to TOF clock frequency inconsistencies, among other variations can affect radial distance readings for all pixels substantially equally. Similarly, if the boresight angle or location of the TOF system is changed due to thermal variation or mechanical impact, the readings for all pixels in the array change in a consistent manner. For example, if a fiducial 135 (or painted fiducial) is known to be located at a radial distance of say 25 cm from TOF system 100, but the TOF system reports a radial distance of 24.5 cm, then a 0.5 cm correction term for the radial distance for all pixels may be obtained. More generally, system 100 can compare the known real fiducial marker coordinates (F1, F2, F3, F4, F5 . . . ) with system 100 measured readings (R1, R2, R3, R4. R5 . . . ) and a correction transform for all pixels in the array may be obtained. Such self-calibration using fiducial markers enables the overall system to produce data of higher accuracy than if no such calibration were employed.

The use of at least two TOF systems 110, 120 (with optional additional TOF system(s) 120', 130' shown in phantom) disposed as to image the surface region 130 of display 140, reduces the likelihood of one user-objected obscuring the image of a second user-object, e.g., one finger blocking a TOF system's view of a second finger. Understandably, correctly recognizing a gesture comprising two (or more) fingers or other user-objects requires that each finger or user-object comprising the gesture be recognizable during interaction with the surface region of the display. The term surface region encompasses the actual surface of display 140 as well as distances of interest y above the region, perhaps 10 mm or so, in the case of a hovering gesture made by user-object(s).

Although FIG. 7A shows TOF systems 110, 120 disposed at corners on the upper edge of the display, the two systems could be disposed at corners along a vertical side edge of the display, or indeed disposed other than at corners of the display, as indicated by phantom TOF positions 110", 120".

In TOF-based system 100, triangulation need not be used, and as a result the y-dimension depth of a typical system 110, 120 need only be about 2 cm. As a result, TOF systems 110, 120 can be robustly packaged in a form factor of about 2 cm×2 cm×2 cm, for attachment to display 140.

Where system 100 includes multiple TOF systems, it is desired that the emitted optical energy, e.g., S1 for a non-phase-based system, or Sout for a phase-based system, from one TOF system be discernable from the optical energy emitted by other TOF systems. If the sensor array in one TOF system responded to reflected back optical signals from other TOF system(s), incorrect gesture recognition would result. Various techniques to prevent cross-talk between TOF systems, e.g., the sensor array in one TOF system processing reflected-back optical energy emitted by another TOF system may be used. For example the optical energy from one TOF system may be at a different wavelength for the other TOF system(s). Alternatively or in addition, each emitted optical signal may include an encoded signature whose presence in a reflected-back optical signal S2 or Sin identifies the emitting system, e.g., 110, or 120, or 110', etc., to the relevant sensor array 56. Encoded signature techniques are known in the art and need not be described in detail herein. Another approach to enable the various sensor arrays in the TOF systems to identify and process optical energy emitted by the system containing the sensor array would be to implement spread-spectrum emitted frequencies, which technique is known in the art and need not be described in detail herein.

Each TOF system includes a processor 62 that can be coupled via data line 170 (which may in fact be wireless) to the processor, e.g., processor 145, that controls display 140 so as to know dynamically the (x,z) position of each object, e.g., 150, 160) appearing on the display. Emitted optical energy from each TOF system is directed towards the surface region 130 of display 140. As a user-object (or indeed any object) moves into the field of view of a TOF system, it reflects back optical energy emitted by element 70 toward the relevant pixel detector array 56. Processor 62 can dynamically discern (x,y,z) coordinate data for the user-object. Y-axis data smaller than a predetermined value can define a hover gesture by the user-object, and y-axis data substantially zero defines a user-object contact with a region of display surface 130. Suppose one or more TOF systems determine user-object contact at location (x1, y1=0,z1) on display surface 130, and that this coordinate is a portion of object 150. A single user-object contact with object 150 might "select" the object and enable repositioning of the object anywhere on display surface 130. As the user's finger (or other user-object) slides the selected object 140 along display surface 130, the TOF system(s) generated DATA' dynamically identifying the new coordinate positions. This information is feedback via image data 170 to cause the displayed location and appearance of the object to be moved accordingly by the processor or computer (not shown) controlling display 140. The "select" gesture typically will have been stored in memory 64, available to processor 62.

Suppose now that two fingers 18-1, 18-2 (user-objects 18-1, 18-2) touch object 150, at TOF sensed locations (x1,0, z1) and (x2,0,z2). A library of two-finger gestures can be pre-stored in memory 64. For example, if the user's two fingers are moved together, this movement will be recognized as a "shrink" gesture, and the image appearing on display 140 will be caused to shrink in size. If the user's two fingers are moved apart, this movement can be recognized by processor 62 and memory 64 as an "enlarge" gesture, and the displayed image will increase in size according to the user's finger movements. The user may instead rotate the two fingers, which movement can be recognized by processor 145, which then processed the displayed image(s) and object(s) as required for immediate re-presentation on display 140.

Embodiments of the present invention may include at least one virtual scroll region 155, 165, defined external to the surface of display 140, which virtual regions may, if desired, be defined to have sub-regions, e.g., 165-A, 165-B, 165-C. The scroll regions typically are defined in the same plane as the surface of display or perhaps slightly in front of that plane, e.g., closer to the user. Although two such virtual regions 155, 165 are shown in FIG. 7A, it is understood that more or fewer regions could be defined, and that such regions may be defined with the other embodiments described herein. In practice, a user may control operation of display 140 and/or selection, manipulation, etc. of objects including icons presented on the display. Any interaction between the user, e.g., user hands, finger(s), stylus/styli, and these regions is imaged by at least one TOF system, e.g., 110, 120. For example, perhaps virtual region 155 is used to adjust brightness of images, e.g., 150, presented on display 130. The user's hand (or stylus) might be moved vertically upward to increase display brightness, or moved vertically downward to reduce image brightness. If desired, the function of one or more virtual scroll regions could be defined by the user's interaction with virtual keys or menus presented on the display itself. For example, perhaps initially scroll-bar 155 is used to adjust display brightness, but then the user can change the functionality by interacting with a menu key, or object, or menu, etc. presented on the display. The successor functionality might be to command scrolling of the images presented on the display, similarly to a conventional scrollbar presented on a display and moved by a mouse. Again it is understood that scrollbars 155, 165 are virtual and are thus invisible to the user. In some embodiments use of virtual scrollbar sub-regions, e.g., 165-A 165-B, 165-C can assist the user in more rapidly accomplishing a desired goal. Perhaps user interaction, e.g., lateral movements of the user's hand or stylus, etc. within sub-region 165-A could be used for coarse lateral scrolling of objects and images presented on the display. In such embodiment, user interaction in central sub-region 165-B could produce slightly finer lateral scrolling, whereas user interaction in the right-hand sub-region 165-C could produce even finer scrolling. Alternatively, system 110 could be programmed to regard user interaction moving from region 165-A to 165-B to 165-C as commanding scrolling at some predetermined velocity. It will be appreciated that the use of TOF sensing enables embodiments of the present invention to recognize and respond to user interaction not merely near or on the surface 140 of display 130, by on regions external, e.g., atop or below, to the left or to the right, of the display itself.

Figure 7B:
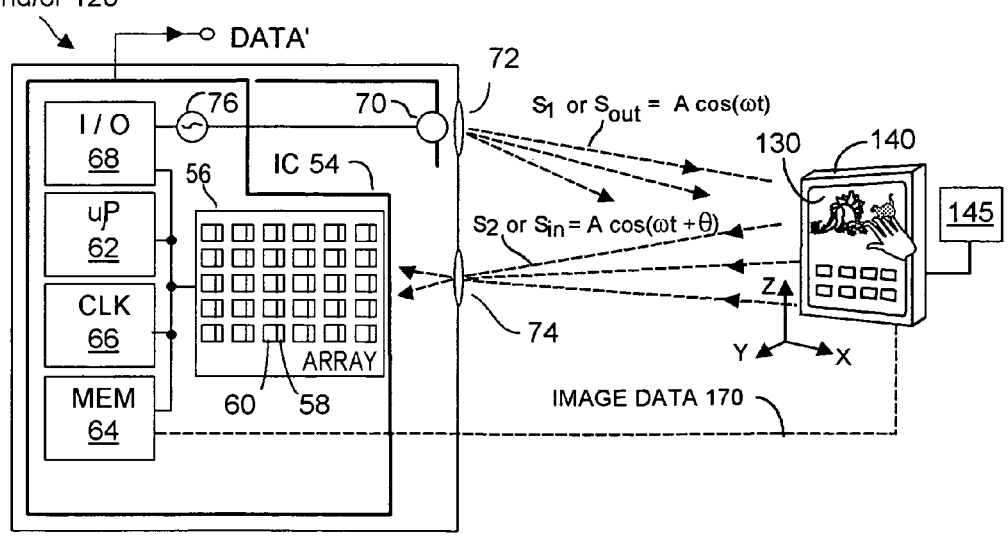
FIG. 7B depicts an exemplary phase-based or non-phased-based TOF system, useable with the system of FIG. 7A, according to embodiments of the present invention.
Figure 8A:
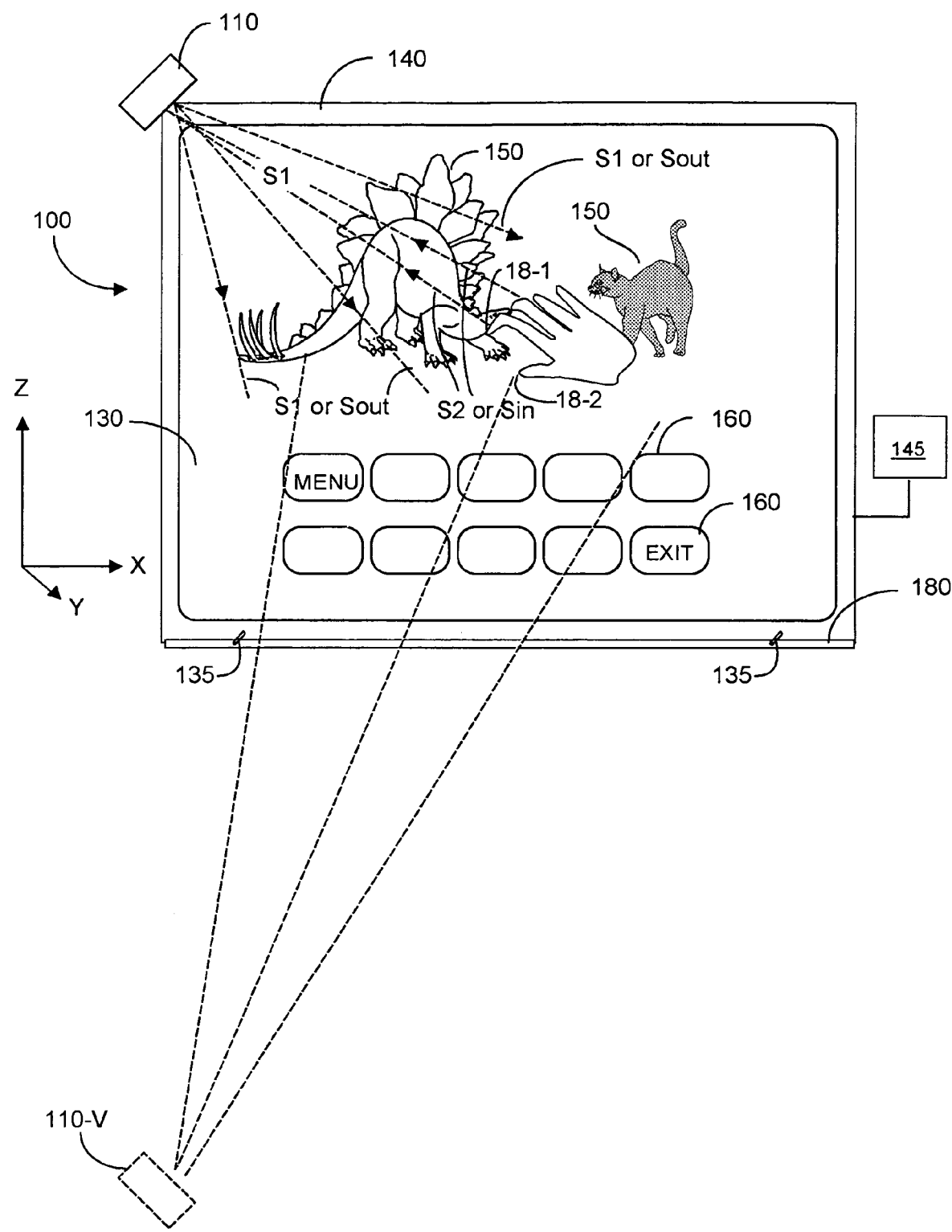
FIG. 8A depicts an exemplary system using at least one phase-based or non-phase based TOF system, useable with the system of FIG. 7A, and at least one mirror creating at least one virtual TOF system and virtual acquired data, according to embodiments of the present invention.

It is understood from FIGS. 7A and 7B that increasing the number of TOF systems can be advantageous in reducing the likelihood of misinterpreted gestures, due to occlusion of one user-object by another user-object. But disposing many TOF systems at various locations around display 130 to reduce occlusion can be an expensive undertaking. FIG. 8A shows a retrofittable system 100 comprising at least one TOF system (phase-based or non phase-based) 110, and a mirror 180 that is disposed to create a virtual TOF system, shown in phantom as 110-V. Note in FIG. 8A that the tip of the user's forefinger 18-1 occludes the tip of the user's thumb 18-2, when viewed or imaged by TOF system 110. Stated differently, TOF system 110 would likely misinterpret a gesture made by the user's thumb and forefinger disposed as shown in FIG. 8A. However retrofitting a mirror 180 opposite TOF system 110 creates a virtual TOF system 110-a that appears to be located behind the mirror the same vertical distance Z that the actual TOF system 100 lies above the mirror. Note that virtual TOF system 110-V sees, e.g., has an unoccluded view of the user's left thumb tip 18-2. TOF system 110 sees and detects not only reflected-back optical illumination S1 or Sin, but also sees and detects optical energy reflected back by mirror 180. This mirror 180-reflected back optical energy is what virtual TOF camera 110-V would see and detect, were it a real rather than a virtual TOF system disposed as shown.

Figure 8B:
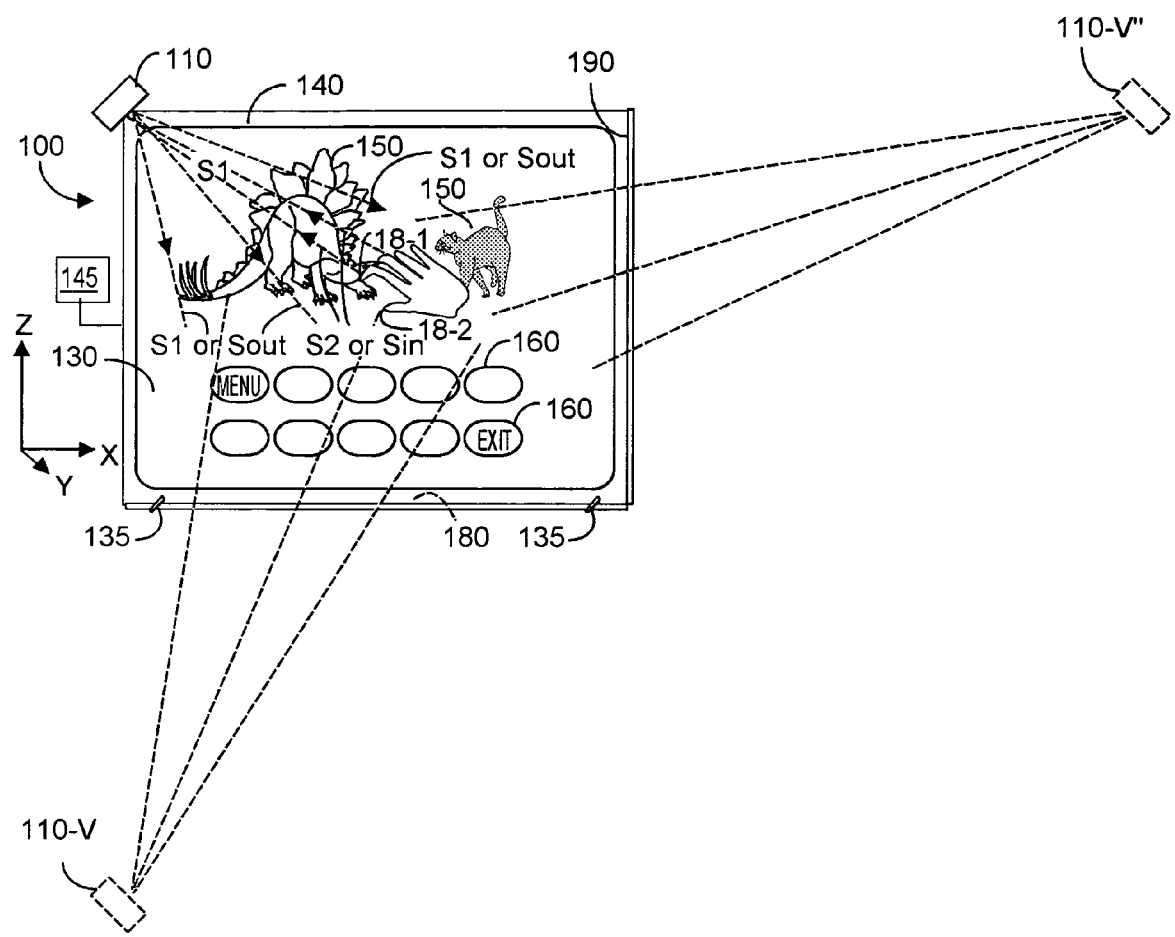
FIG. 8B depicts an exemplary system using at least one phase-based or non-phased based TOF system, useable with the system of FIG. 7A, and two mirrors creating two virtual TOF systems and virtual acquired data, according to embodiments of the present invention.

FIG. 8B depicts an alternative retrofittable system 100 in which one real TOF system 110 and two mirrors 180, 190 are used. In FIG. 8B, TOF system 110 is distance X to the left of mirror 190, retrofitably disposed on the right side of display 140. Mirror 190 creates a virtual TOF system 110-V''' disposed the same distance X behind, e.g., to the right of, mirror 190 in FIG. 8B. Emitter 70 within system 100 emits optical energy S1 or Sout (depending upon non phase-based or phase-based TOF detection), some of which optical energy is reflected-back by user-objects, e.g., 18-1, and perhaps (to the extent it is not occluded) 18-2. This reflected-back optical energy is detected by sensor array 56 and processed by processor 62. However sensor array 56 also sees the same reflected-back optical energy that phantom TOF system 110-V sees (were it a real TOF system), and also sees the same reflected-back optical energy that phantom TOF system 110-V''' sees (were it a real TOF system). Thus the presence of multiple mirrors, preferably retrofitably attachable to display 140, enables one real TOF system 110 to see user-objects with less probability of occlusion.

In FIG. 8B, the presence of mirrors 180 and 190 can create undesired reflections of emitted optical energy from TOF system 110 some of which may find its way back into sensor array 56. Preferably these undesired reflections are taken into account and discarded, e.g., by processor 62 within TOF system 110, to preserve integrity of the actual TOF data. These undesired reflections will generally traverse longer optical paths between optical source 70 and sensor array 56 than will the other reflected-back optical signals. Techniques including varying frequency of the emitted optical energy are known in the art for discerning and discarding or at least accounting for these spurious optical energy signals.

Figure 8C:
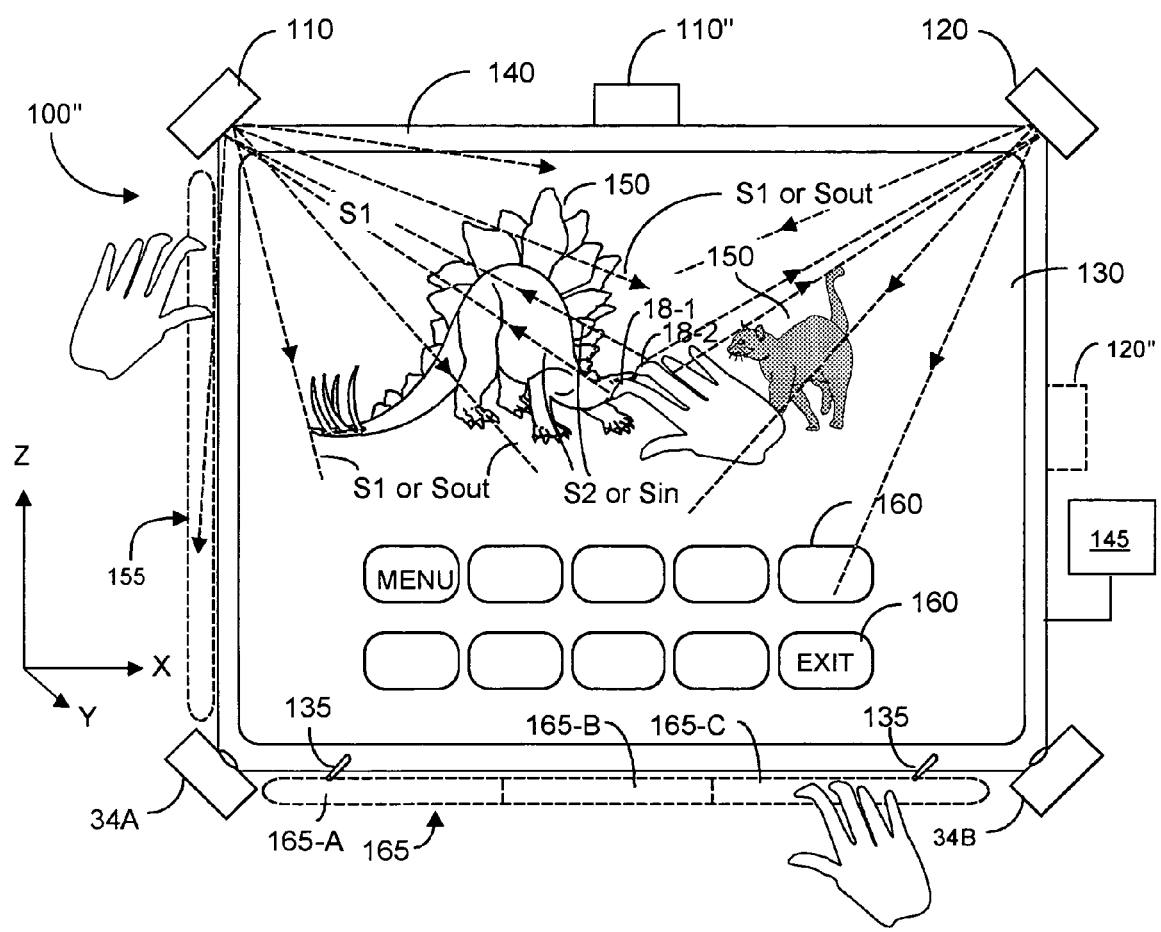
FIG. 8C depicts an exemplary system using at least one TOF system to acquire and process at least one of z-depth data and (active light source) A-brightness data in conjunction with two spaced-apart two-dimensional cameras, to recognize passive user gestures made on or adjacent a large screen video display including virtual scroll regions, according to embodiments of the present invention.

FIG. 8C depicts an embodiment in which system 100' includes at least one TOF system, e.g., 110, 120, 110'', and at least one two-dimensional camera 134A, 134B. Preferably the relevant FOVs encompass substantially most of the surface 130 of display 140, as well as hover regions spaced-apart (in the y-dimension) from surface 130, and preferably including virtual scroll regions, e.g., 155, 165. It is understood the location of the various TOF system(s) and two-dimensional camera(s) may be other than is depicted in FIG. 8C. As was described with respect to the various TOF systems, e.g., system 50' (FIG. 5A), system 110, 120 (FIG. 7B), TOF systems with which embodiments of the present invention may be practiced typically acquire and process TOF data of the form $S_{in} = A \cdot \cos(\omega \cdot t + \theta)$. Such TOF data can be thought of as having two separate components: z-depth data that is related to phase shift $\theta$ in phase-based TOF systems, and brightness data that is related to amplitude coefficient A (responsive to active optical energy emitted by emitter 70). In FIG. 8C, each TOF system comprises overall system 100' acquires and processes at least one type of TOF data, e.g., z depth data, A brightness data (caused by the reflected-back emitted active optical energy), or both types of TOF data. It is understood that TOF systems also acquire ambient light, e.g., light not created by the emitting light source. In FIG. 8C for ease of illustration signal paths between processor 145 and the various TOF system(s) and two-dimensional camera(s) is not depicted in FIG. 8C.

Figure 1:
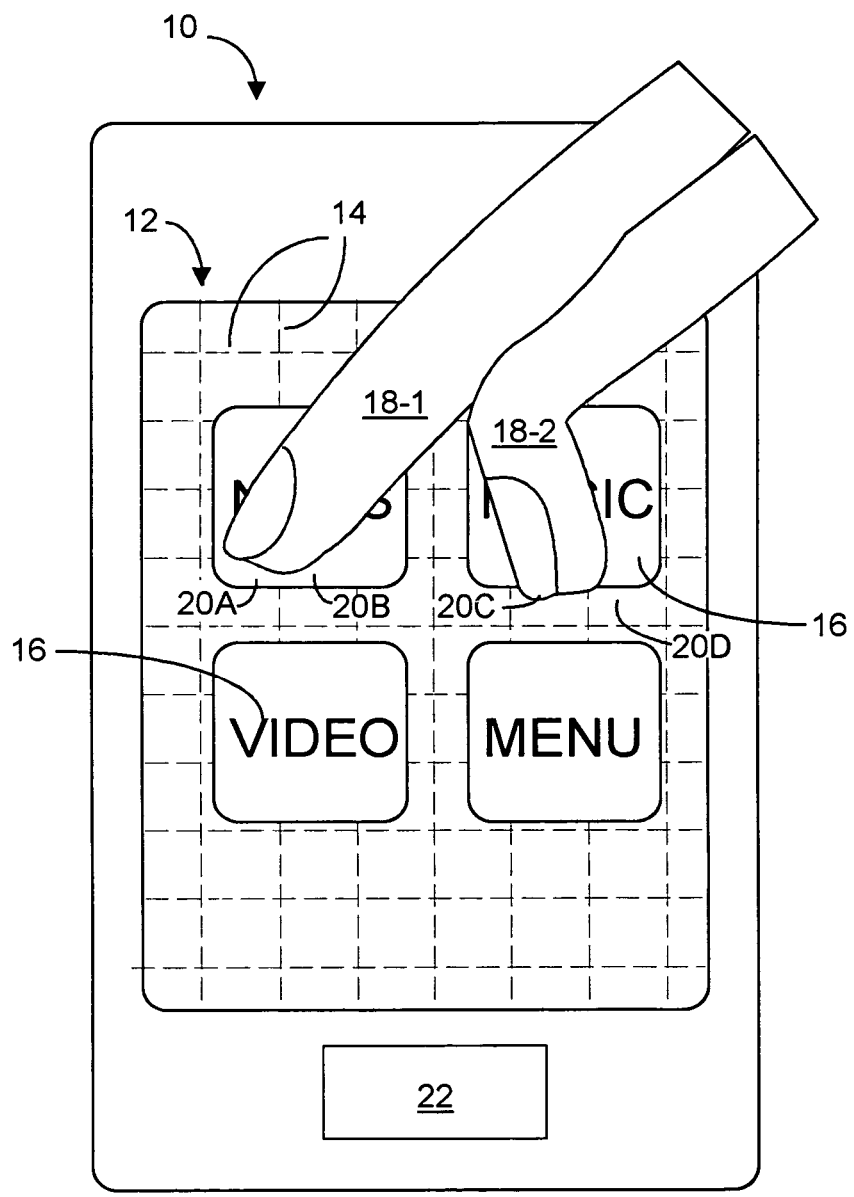
FIG. 1 depicts a capacitive-type touch screen for interaction with an active user-objected, according to the prior art.
Figure 2A:
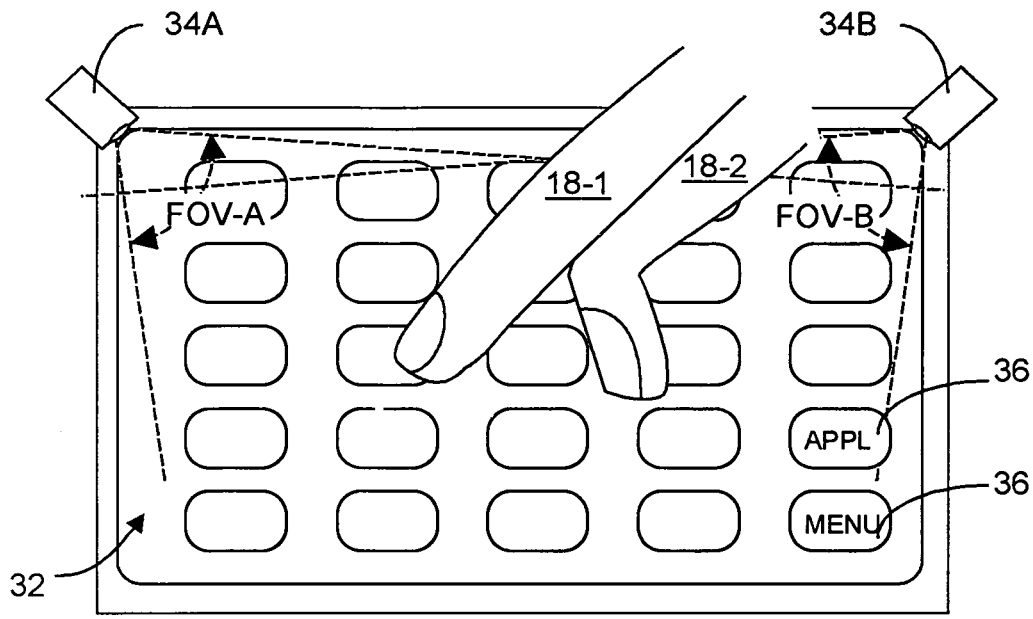
FIG. 2A depicts a stereographic camera system used to try to discern user interaction and gestures made with respect to a passive screen display, according to the prior art.
Figure 2B:
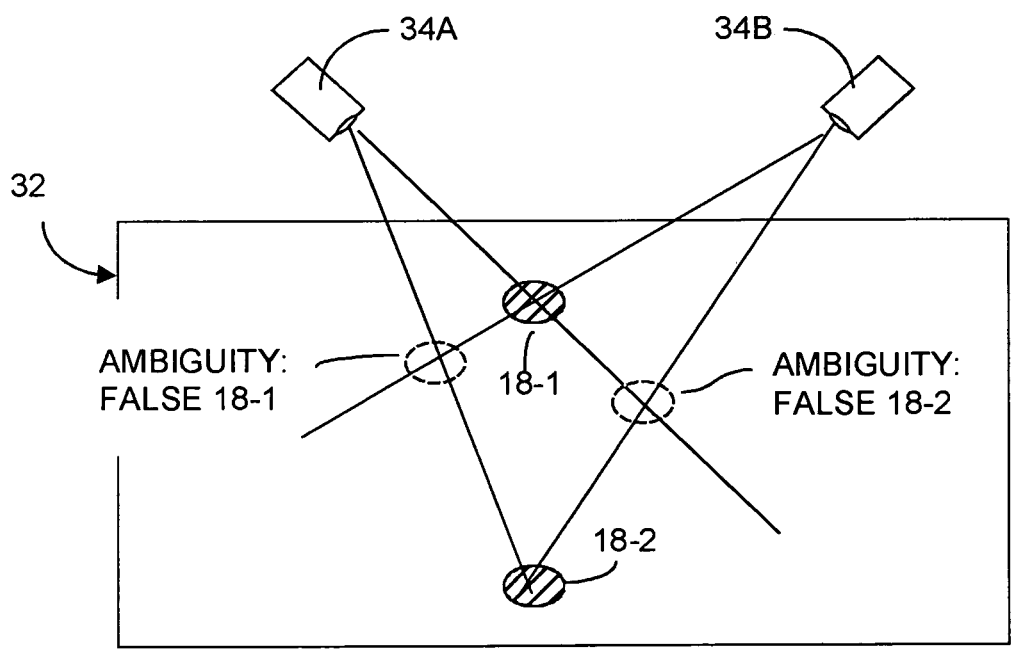
FIG. 2B depicts the ambiguity problem that is inherent with stereographic camera imaging, according to the prior art.
Figure 3:
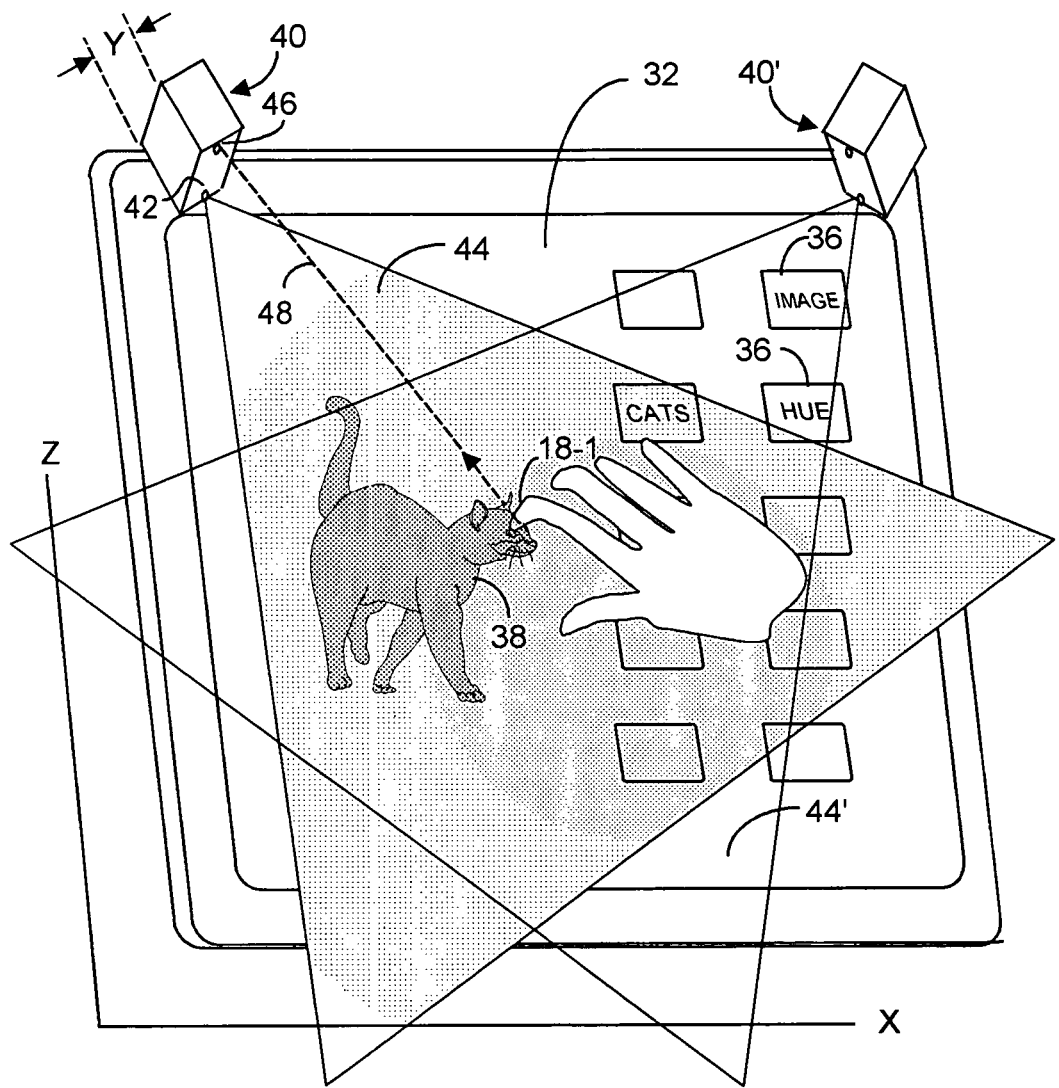
FIG. 3 depicts use of structured light to discern user interaction and gestures made with respect to a passive screen display, according to the prior art.
Figure 4:
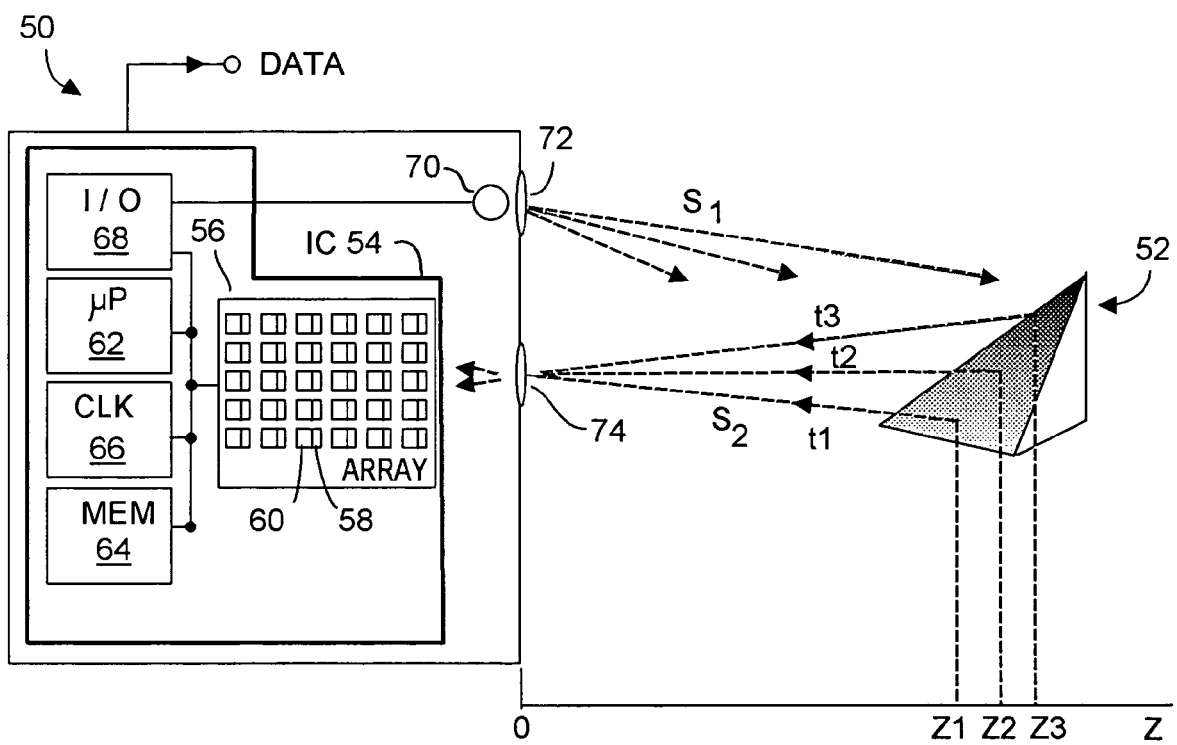
FIG. 4 is a block diagram of a generic time-of-flight (TOF) three-dimensional imaging system, according to the prior art.

Assume first that TOF system 110 (and/or 110'' and/or 120 in FIG. 8C) processes brightness data A. As was noted with respect to prior art FIGS. 2A and 2B, spaced-apart stereographic systems are plagued with ambiguity in their acquired data. However TOF data acquired from at least one TOF system (e.g., 110 and/or 110'' and/or 120 as shown in FIG. 8C) can be used to disambiguate or refine the data acquired by the two spaced-apart two-dimensional cameras 34A, 34B. The result is a correct interpretation of user-object interaction with objects, e.g., 150, displayed on monitor 140, and/or as respects interaction in three-dimensional space, including correct identification of user-interactions in the form of gestures made in three-dimensional hover regions and/or in virtual scroll regions. Thus system 100'' uses aspects of TOF data and two-dimensional image data in a multi-modal approach that can readily detect user-interaction with regions on display surface 130 and/or with virtual scroll regions 155, 165, with reduced design requirements imposed upon the TOF system. For example, the TOF system(s) could employ less powerful optical emitters 70 (see FIG. 4, FIG. 5A, FIG. 7B), with resulting decrease in production cost of the overall system. Further, the user-interaction data acquired by system 100'' can be more robust as a result of the described multi-modal approach and indeed the data can be better than if only TOF data or only two-dimensional data alone were used.

Figure 8D:
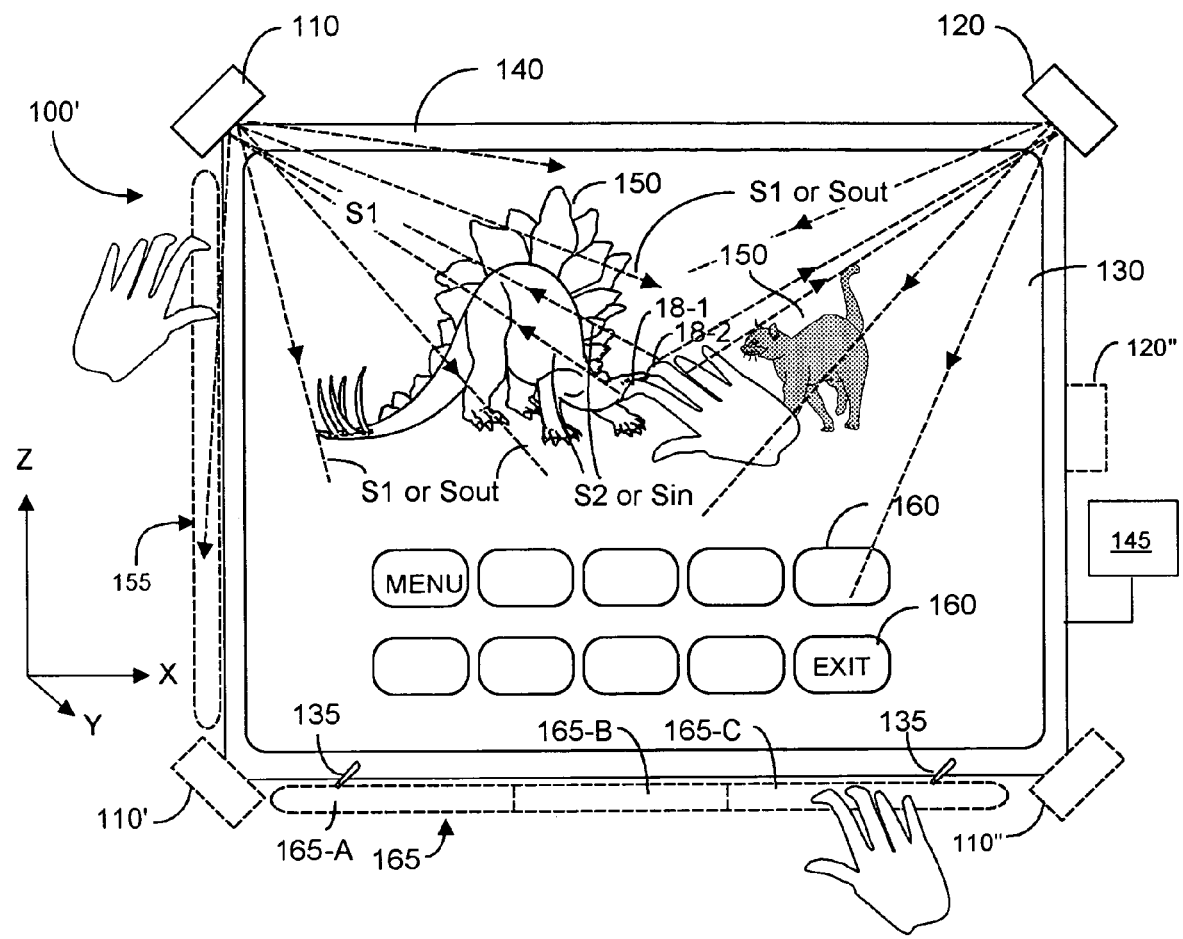
FIG. 8D depicts an exemplary system using at least two TOF systems to recognize passive user gestures made on or adjacent a large screen video display including virtual scroll regions, according to embodiments of the present invention.

FIG. 8D depicts a system 100' employing at least first and second TOF systems, e.g., 110, 120, or 110, 110', or 110', 110'', or 110''', 120 disposed such that relevant FOVs encompass substantially most of the surface 130 of display 140, as well as hover regions spaced-apart (in the y-dimension) from surface 130, and preferably including virtual scroll regions, e.g., 155, 165. In this system, if two TOF systems are employed and each obtains a non-occluded view of the user-interaction, then z-depth data from each system can be combined, e.g., by processor 145, to identify and locate the position of the user interaction. In such a non-occlusion scenario, if desired A-brightness data could also be combined by processor 145 to identify and locate the position of the user interaction. However if there is potential user object occlusion, a combination of z-depth data and A-brightness data can be used by processor 145. In a sense, the manipulation of stereographically acquired two-dimensional data in FIG. 8C is replaced by the configuration of FIG. 8D with use of active brightness (A-brightness) data from the two TOF systems.

Figure 8E:
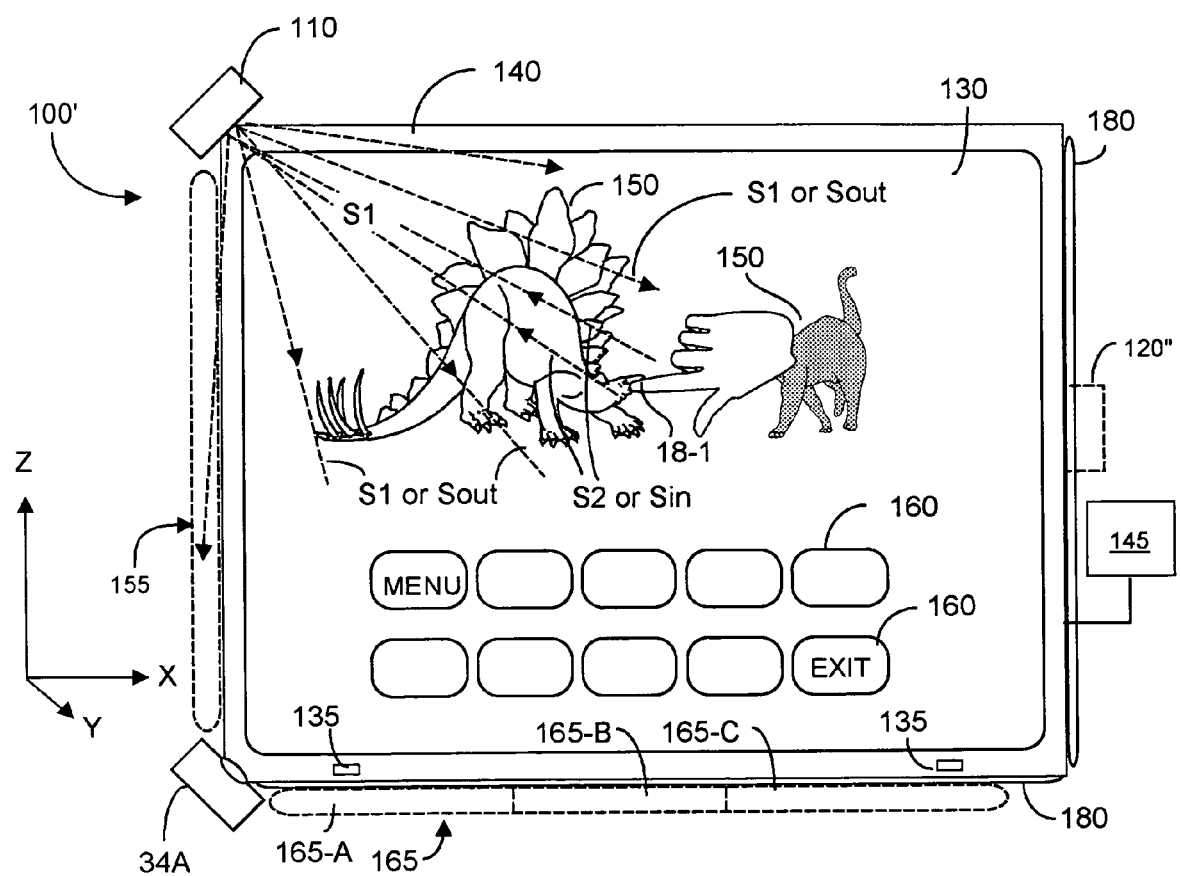
FIG. 8E depicts an exemplary system using one TOF system and at least one two-dimensional camera or at least one mirror for recognition of relatively non-obstructed passive user gestures made on a large screen video display including virtual scroll regions, according to embodiments of the present invention.

FIG. 8E depicts an embodiment of the present invention in which preferably a single (non-occluding) user-object, e.g., 18-1, interacts with objects displayed on the surface 130 of display 140 or with portions of virtual scroll regions, e.g., 155, 165, in the same plane as surface 130. In this embodiment, a TOF system 110, and at least one of a two-dimensional RGB or gray scale camera 34A or a mirror 180 (disposed horizontally or vertically as shown) capture the user-interaction. TOF system 110 uses at least one of z-image data and A-brightness data in this application. This embodiment can be less expensive to implement when compared to various other embodiments that have been described. As noted, an embodiment of system 100' comprising a TOF system 110 can resolve user-object display surface touching, hover detection and virtual scroll region detection where there is no occlusion. Adding at least one of a two-dimensional camera 34A or a mirror 180 can assist the TOF system when the user-object is unoccludably visible to both the TOF system and camera 34A or mirror 180. This assistance is in the form of triangulation. In FIG. 8E, a system comprising a TOF system 110 and a camera 34A can identify display surface touching, and gestures in hover regions or in virtual scroll regions. However, a system comprising a TOF system 110 and a mirror 180 can identify display surface touching but cannot (if there is occlusion) identify gestures made in hover regions or in virtual scroll regions (unless the virtual scroll region space is in the same horizontal plane as display surface 130). However if mirrors 180 had a surface curved or sufficiently large planar surface to provide a FOV encompassing hover space or virtual scroll region space, then gestures in such an embodiment could be recognized, even in the presence of occlusion. It will be appreciated that in many applications, for example a kiosk, when simple menu selections are presented on display 140, the embodiments of system 100' in FIG. 8E may be of use. Note too that fiducial markers 135 are depicted in FIG. 8E as being painted regions on the bezel of monitor 140.

As will now be described, in the various embodiments described herein it can be useful to emit optical energy, e.g., $S_1$ or $S_{out}$ that has a graded intensity profile such that more optical energy is emitted into regions on or close to display surface 130, than is emitted in regions spaced further apart from display surface 130, e.g., emitted into hover zones. In practice, greater detection resolution in terms of precision of user-object location on within a few mm of display surface 130 is desired than is necessary to determine approximate user-object location in spatial regions spaced-apart from display surface 130. For example, discerning a clockwise motion of a user-object in space to identify a given gesture requires substantially less precision in locating user-object coordinates than does identifying which object displayed on monitor 140 is being interacted with by a user-object coming into contact with a region of display surface 130. Use of graded emissions allows a less powerful, e.g., less expensive, emitter 70 to be employed, while still delivering sufficiently high levels of optical energy at or near display surface 130, where higher detection resolution is required.

Figure 9:
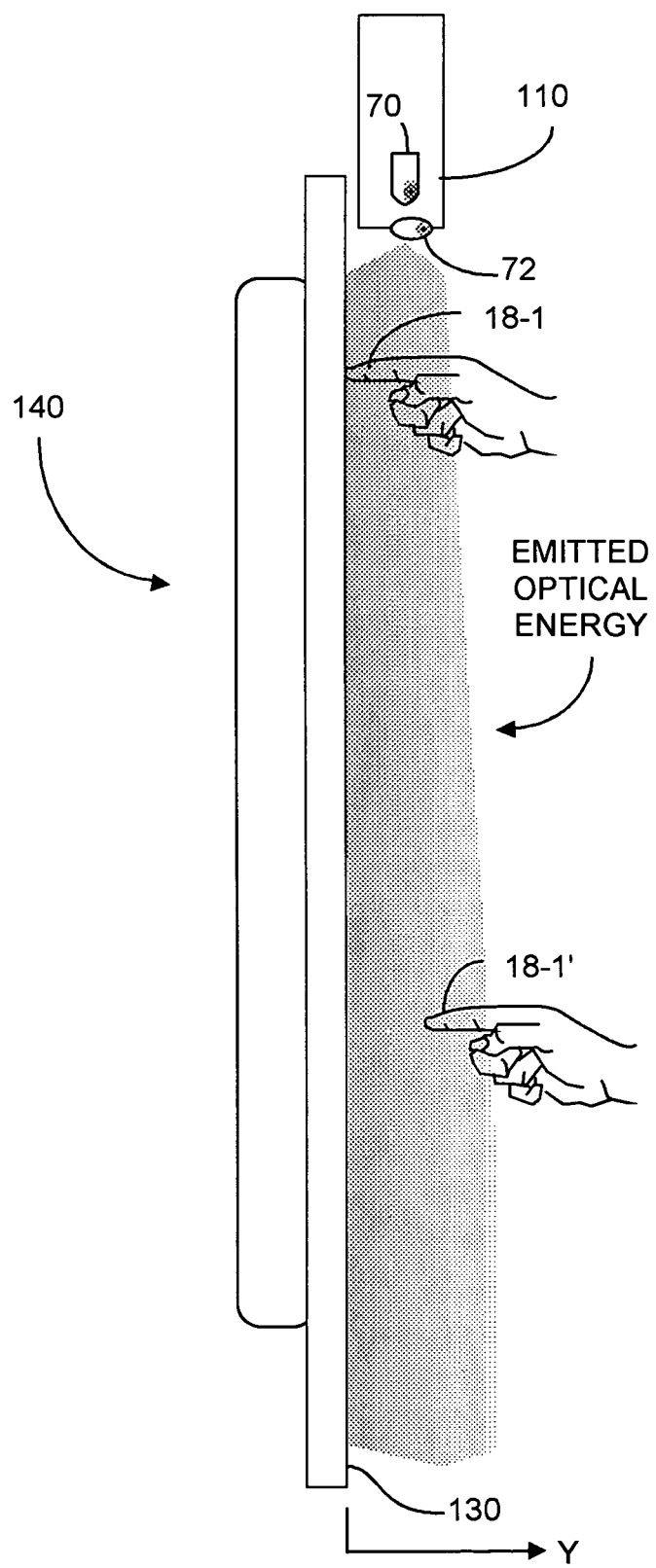
FIG. 9 depicts an embodiment in which hover zone detection is implemented and in which optical energy emitted by the TOF system(s) is graded in intensity such that more emitted optical energy is directed toward the surface of the display screen than is directed into the hover zone that is defined further away from the display screen surface according to embodiments of the present invention.

FIG. 9 depicts an exemplary method of providing such graded emissions. Within TOF system 110, optical emitter 70 is shown partially cross-hatched to indicate a gradient in the emitted optical energy. If desired, optics 72 could also be shaped or otherwise altered, as suggested by the cross-hatched region, to promote the desired optical energy gradient. In FIG. 9, the darker gradient portion of emitted optical energy denotes higher concentration, e.g., more watts/area, at or close to display surface 130. Similarly in FIG. 9, the less dark gradient portion of emitted optical energy implies less watts/area in the hover and other regions spaced-apart from display surface 130. Exemplary density change might be on the order of perhaps 5:1, e.g., perhaps 80% less optical energy density is needed to adequately detect simple hovering, as compared to a desired greater optical energy density to adequately detect user-object interaction with display surface 130. The greater concentration or density of emitted optical energy is presented primarily in the region close to display surface 130, where finer resolution of detection is required. The ability to emit optical energy with such a gradient means that a less powerful, e.g., less costly, emitter source 70 may be used in each TOF system, e.g., 110, 120, etc. in any or all of the described embodiments.

Referring still to FIG. 9, the distal portion of emitter 70 is depicted as having a graded coating and, optionally, a graded coating or intentional distortion, in optics 110 to produce the gradient in the emitted optical energy. In some embodiments, processor 145 (see exemplary FIG. 8C) can detect whether for a period of time, perhaps ten seconds, only user gestures are being detected rather than any user-object interface at surface 130. In some embodiments, the TOF system(s) and processor 145 can command emitter 70 and/or optics 72 to dynamically alter characteristics to now direct the greater concentration of optical energy into the hover region, which is somewhat spaced-apart from surface 130. When the TOF system(s) and processor 145 detect that user-object interaction is occurring at display surface 130, processor 145 can cause emitter 70 and/or optics 72 to dynamically reconfigure to direct the greater density of emitted optical energy towards surface 130, as shown in FIG. 9. In this fashion, optimum use of emitter 70 is made such that a lower power emitter can suffice in a given application.

In FIG. 9, monitor 140 may be large scale, e.g., a transverse or diagonal measure exceeding perhaps 22 cm, or may be small scale, with a transverse measure of perhaps 4 cm. As such, it is understood that monitor 140 may be provided as a computer monitor, a monitor for a kiosk, a monitor on a PDA, or the monitor on a handheld cell phone, or the like. Thus, embodiments of the present invention can enable even a handheld cell phone to recognize user-gesture touching and gestures made in three-dimensional space. A user might hold the cell telephone whose display is presented on monitor 140 in one hand, and make gestures with the other hand. Alternatively, some pre-defined gestures may be made by moving the cell telephone relative to the user, perhaps moving the cell telephone clockwise relative to the user's face to command an increase in audio volume emanating from the cell telephone, etc.

Many of the embodiments described herein can benefit by having processor 145 decide which of the various TOF systems, e.g., 110, 120, etc., and/or two-dimensional camera, e.g., 34A, 34B is presently acquiring the best data, and can favor use of that data over data acquired from the other sources. So doing allows the overall system to more rapidly and more reliably discern and identify user-object interaction with display surface 130 and/or with virtual scroll regions 155, 165. Memory such as memory 64 (see FIG. 7B) can include a software routine executable by processor 62 (or other processor) to ascertain relative quality of the optical data being acquired at any given time. Should there be uncertainty at to precise location, data from the currently deemed highest quality data acquiring sensor or camera can be used to quickly make a decision. For example, data from an occluded user-object should not be used, in favor of using data representing a non-occluded user-object. One useful metric is the brightness co-efficient A associated with data acquired by each TOF system. For example if there are three TOF systems E, F, and G, for each TOF system viewing an object, assume that the associated TOF system brightnesses are Ea, Fa, Ga, and that the three TOF systems produce respective three-dimensional coordinates Ed, Fd, Gd. In a preferred embodiment, an improved estimate (Q) of object location in the data acquired from a given TOF system at a given time is approximated by:

$$Q \approx [Ea \cdot Ed + Fa \cdot Fd + Ga \cdot Gd]/[Ea + Fa + Ga]$$

Broadening the concept of Q, for a given object, a number N (e.g., three in the above example) systems or cameras yield N (e.g., three in the above example) coordinates. The approximation seeks to combine the coordinate data in a best manner that gives more weight to the better or more reliable data to produce better overall data. Many heuristical approaches could be used, and the above approach uses a linear weighted Bary-center in which weights are related to active brightness coefficients. The Bary-center weights are obtained, and then replaced by active brightness. This approach takes into account the fact that TOF systems that are closer to the target-object will have lower geometrical error. Thus, in a preferred embodiment, greater quality weighting is assigned within the system to such TOF systems that are relatively closer to the target-object and are producing higher active brightness data.

Modifications and variations may be made to the disclosed embodiments without departing from the subject and spirit of the invention as defined by the following claims.

What is claimed is:

1. A system for use with a processor-generated display presented on a display device in a display area, the system recognizing at least one user-object interaction with a region on a surface of said display device, a hover region defined in three-dimensional space spaced-apart from said surface of said display device, and a virtual scroll region defined in three-dimensional space adjacent a peripheral region of said display area, the system including:
   a first time-of-flight (TOF) system disposed to emit optical energy in a first field of view (FOV) defined generally toward said surface of said display device and to acquire at least a fraction of the emitted said optical energy that is reflected-back by a passive user-object within said first FOV, and to process at least one of z-depth data and A-brightness data within reflected-back said optical energy to discern a probable location in three-dimensional space of said at least one passive user-object interaction;
   a second system associated with a second field of view (FOV) defined generally toward said surface of said display device, said second system including at least one of a second TOF system, at least one two-dimensional camera, and at least one mirror, wherein said first TOF system and said second system detect at least a passive user-object interaction in a location;
   a system processor coupled to said first TOF system and to said second system to discern from at least one of processed z-depth data and processed A-brightness data acquired by the first TOF system and the second system the location in three-dimensional space of said at least one user-object, said location being any of (1) a portion of said surface of said display device touched by said user-object, (2) a location in said hover region, and (3) a location in a virtual scroll region, an output of said system processor coupleable to said processor-generated display to affect operation of said display on said display device.

2. The system of claim 1, wherein said second system includes second time-of-flight (TOF) system disposed to emit optical energy in a second field of view (FOV) defined generally toward said surface of said display and to acquire at least a fraction of the emitted said optical energy that is reflected-back by a user-object within said second FOV, and to process at least one of z-depth data and A-brightness data within reflected-back said optical energy to discern a probable location in three-dimensional space of said at least one user-object interaction.

3. The system of claim 1, wherein said display device has a transverse dimension exceeding 22 cm.

4. The system of claim 1, wherein said system is retrofitably coupleable to said display device.

5. The system of claim 1, further including:
   a library of stored gestures that a user-object may define in three-dimensional space within a FOV of at least one of said first TOF system and said second system, said library coupled to said system processor;
   wherein system processor recognition of a user-object gesture detected by said system affects operation of said display on said monitor commensurate with said gesture.

6. The system of claim 1, wherein said user-object includes at least one of a user finger, a user hand, a user-manipulated stylus, a user-manipulated wand, a non-capacitive object, and a non-deformable object.

7. The system of claim 2, wherein one of said first TOF system and said second TOF system is a phase-based TOF system.

8. The system of claim 2, wherein each of said first TOF system and said second TOF system processes one type of TOF data to discern said probable location, said one type of TOF data selected from a group consisting of z-depth data, and A-brightness data.

9. The system of claim 2, wherein at least one of said first TOF system and said second TOF system emits a higher density of optical energy nearer said surface of said display than is emitted in a region spaced-apart from said surface of said display.

10. The system of claim 1, wherein user-object interaction affects operation of said display in a manner selected from a group consisting of (a) user-object manipulation of an object presented on said display, (b) user-object manipulation of operation of said display, (c) user-object manipulation with a said virtual scroll region to manipulate operation of said display, and (d) user-object manipulation in a said three-dimensional hover region to manipulate operation of said display.

11. The system of claim 1, including at least one fiducial marker disposed so as to enable self-calibration of at least said first TOF system so as to improve accuracy of data acquired therefrom.

12. The system of claim 1, further including at least one of (a) means for favoring data acquired from one of said first TOF system and said second system when it is determined that one said system is providing more reliable data, (b) means for improving data acquired by at least one of said first TOF system and said second system, (c) means for combining data from at least said first TOF system and said second system so as to improve accuracy of said system, (d) means for employing active brightness data acquired from at least said first TOF system to improve accuracy of said system, and (e) means for employing at least one of stereographic imaging, triangulation, and structured light to improve accuracy of data acquired by said system.

13. The system of claim 1, wherein said peripheral region is located adjacent to and not overlapping said display area.

14. A method, for use with a processor-generated display presented in a display area of a display device, to recognize at least one user-object interaction with at least one of region on a surface of said display device, a hover region defined in three-dimensional space spaced-apart from said surface of said display device, and a virtual scroll region defined in three-dimensional space adjacent a peripheral region of said display area, the method including the following steps:
   (a) disposing a first time-of-flight (TOF) system so as to emit optical energy in a first field of view (FOV) defined generally toward said surface of said display device and to acquire at least a fraction of the emitted said optical energy that is reflected-back by a user-object within said first FOV, and to process at least one of z-depth data and A-brightness data within reflected-back said optical energy to discern a probable location in three-dimensional space of said at least one user-object interaction;

(b) disposing a second system associated with a second field of view (FOV) defined generally toward said surface of said display device, said second system including at least one of a second TOF system, at least one two-dimensional camera, and at least one mirror; and (c) discerning from at least one of processed z-depth data and processed A-brightness data from said first TOF system an actual location in three-dimensional space of said at least one user-object, said location being any of (1) a portion of said surface of said display touched by said user-object, (2) a location in said hover region, and (3) a location in said virtual scroll region, an output of said system processor coupleable to said processor-generated display to affect operation of said display on said display device.

15. The method of claim 14, wherein step (b) includes disposing a second time-of-flight (TOF) system disposed to emit optical energy in a second field of view (FOV) defined generally toward said surface of said display and to acquire at least a fraction of the emitted said optical energy that is reflected-back by a user-object within said second FOV, and to process at least one of z-depth data and A-brightness data within reflected-back said optical energy to discern a probable location in three-dimensional space of said at least one user-object interaction.

16. The method of claim 15, further including:
storing a library of stored gestures that a user-object may define in three-dimensional space within a FOV of at least one of said first TOF system and said second TOF system; and
determining from recognition of a user-object gesture detected by said system affects operation of said display on said monitor commensurate with said gesture.

17. The method of claim 14, wherein said user-object includes at least one of a user finger, a user hand, a user-manipulated stylus, a user-manipulated wand, a non-capacitive object, and a non-deformable object.

18. The method of claim 14, wherein user-object interaction affects operation of said display in a manner selected from a group consisting of (i) user-object manipulation of an object presented on said display, (ii) user-object manipulation of operation of said display, (iii) user-object manipulation with a said virtual scroll region to manipulate operation of said display, and (iv) user-object manipulation in a said three-dimensional hover region to manipulate operation of said display.

19. The method of claim 14, wherein said first TOF system emits a higher density of optical energy nearer said surface of said display than is emitted in a region spaced-apart from said surface of said display.

20. The method of claim 14, further including at least one additional step selected from a group of steps consisting of (i) providing at least one fiducial marker so as to enable self-calibration of at least said first TOF system, (ii) providing means for favoring data acquired from one of said first TOF system and said second system when it is determined that one said system is providing more reliable data, (iii) providing means for improving data acquired by at least one of said first TOF system and said second system, (iv) providing means for combining data from at least said first TOF system and said second system so as to improve accuracy of said system, (v) providing means for employing active brightness data acquired from at least said first TOF system to improve accuracy of said system, and (vi) providing means for employing at least one of stereographic imaging, triangulation, and structured light to improve accuracy of data acquired by said system.

\* \* \* \* \*